US012619058B2

(12) United States Patent
Li et al.

(10) Patent No.: US 12,619,058 B2
(45) Date of Patent: May 5, 2026

(54) HIGH-THROUGHPUT SPATIAL IMAGING SYSTEM FOR BIOLOGICAL SAMPLES

(71) Applicant: Applied Materials, Inc., Santa Clara, CA (US)

(72) Inventors: Ang Li, Santa Clara, CA (US); Joseph R. Johnson, Redwood City, CA (US); Jean Marc Fan Chung Tsang Min Ching, Bellevue, WA (US); Dan Xie, Pleasanton, CA (US); Stephen Hsiang, San Francisco, CA (US); Yun-Ching Chang, Pleasanton, CA (US)

(73) Assignee: Applied Materials, Inc., Santa Clara, CA (US)

( * ) Notice: Subject to any disclaimer, the term of this patent is extended or adjusted under 35 U.S.C. 154(b) by 366 days.

(21) Appl. No.: 18/365,853

(22) Filed: Aug. 4, 2023

(65) Prior Publication Data

US 2024/0045191 A1 Feb. 8, 2024

Related U.S. Application Data

(60) Provisional application No. 63/395,261, filed on Aug. 4, 2022.

(51) Int. Cl.
*G02B 21/00* (2006.01)
*G02B 21/06* (2006.01)
*G06T 7/00* (2017.01)

(52) U.S. Cl.
CPC ......... *G02B 21/0076* (2013.01); *G02B 21/06* (2013.01); *G06T 7/0012* (2013.01)

(58) Field of Classification Search
CPC .... G02B 21/0076; G02B 21/06; G02B 21/00;

G02B 21/0004; G02B 21/002; G02B 21/0032; G02B 21/0036; G02B 21/0052; G02B 21/006; G02B 21/0064; G02B 21/008; G02B 21/26; G02B 21/36;
(Continued)

(56) References Cited

U.S. PATENT DOCUMENTS 8,885,913 B2 * 11/2014 Basiji ................. G01N 21/6428
356/326
2002/0148984 A1 * 10/2002 Watkins ............... G02B 21/008
250/559.45
(Continued)

FOREIGN PATENT DOCUMENTS

KR 20190054141 A 5/2019

OTHER PUBLICATIONS

Application No. PCT/US2023/071705 , International Search Report and the Written Opinion, Mailed on Nov. 20, 2023, 12 pages.

*Primary Examiner* — Arnel C Lavarias
(74) *Attorney, Agent, or Firm* — Kilpatrick Townsend & Stockton LLP

(57) ABSTRACT

An imaging system for capturing spatial images of biological tissue samples may include an imaging chamber configured to hold a biological tissue sample placed in the imaging system; a light source configured to illuminate the biological tissue sample to activate a plurality of fluorophores in the biological tissue sample; and a plurality of Time Delay and Integration (TDI) imagers configured to simultaneously scan the biological tissue sample, where the plurality of TDI imagers may be configured to separately receive light from different ones of the plurality of fluorophores.

20 Claims, 19 Drawing Sheets

(58) Field of Classification Search

CPC .. G02B 21/361; G02B 21/365; G02B 21/367;
G06T 7/0012; G01N 21/6456; G01N
21/6458; G01N 2021/6463; G01N
2021/6471; G01N 21/6486

USPC ....... 359/385, 362, 363, 368, 369, 388, 389,
359/390, 391, 393

See application file for complete search history.

(56) References Cited

U.S. PATENT DOCUMENTS

| | | | |
|---|---|---|---|
| 2009/0141126 A1* | 6/2009 | Soenksen ............. | G02B 21/008 |
| | | | 348/79 |
| 2011/0115897 A1 | 5/2011 | Najmabadi et al. | |
| 2012/0099852 A1* | 4/2012 | Staker ...................... | H04N 7/18 |
| | | | 348/E17.001 |
| 2020/0033240 A1 | 1/2020 | Cherubini et al. | |
| 2022/0197002 A1 | 6/2022 | Cang et al. | |
| 2022/0214278 A1 | 7/2022 | Trintchouk et al. | |

* cited by examiner

Image with TDI (Time Delay Integration) camera

Image with regular sCMOS camera

1800

Standard Microscope Slide
1804

Gasket
1810

Flow Cell Plate
1812

Sample on underside of slide
1808

HIGH-THROUGHPUT SPATIAL IMAGING SYSTEM FOR BIOLOGICAL SAMPLES

CROSS-REFERENCE TO RELATED APPLICATIONS

This application claims priority to Provisional U.S. Patent Application No. 63/395,261 filed Aug. 4, 2022 entitled "HIGH-THROUGHPUT SPATIAL IMAGING SYSTEM FOR BIOLOGICAL SAMPLES," the entire disclosure of which is hereby incorporated by reference, for all purposes, as if fully set forth herein.

TECHNICAL FIELD

This disclosure generally describes capturing spatial images of biological tissue samples. More specifically, this disclosure describes an imaging system using Time Delay Integration (TDI) imagers and other techniques to improve the throughput when capturing spatial images of tissue samples.

BACKGROUND

Spatial biology is the study of the cellular and sub-cellular environment across multiple dimensions. Spatial biology tools may be used to determine which cells are present in a tissue sample, where they are located in the tissue sample, their biomarker co-expression patterns, and how these cells organize interact within the tissue sample. A sample slide may be prepared with a tissue sample in various imaging workflows may be executed to generate a comprehensive image of the tissue at the cellular and sub-cellular level, producing a single-cell resolution to visualize and quantify biomarker expression. The resulting images may expose how cells interact and organize within the tissue sample.

Capturing these complex images of the cell environment may be referred to as spatial omics. High-resolution, highly multiplexed spatial omics is rapidly becoming an essential tool in understanding diseases and other biological conditions. Typically, this type of analysis involves hundreds of complex factors, variables, and processes. An integrated solution may combine imaging and process control methods into a single machine for performing spatial omics. However, generating full spatial images of a tissue sample that accurately represent the volume of the sample requires many individual imaging scans of the sample. This large number of scans required for a full imaging analysis severely limits the throughput of the system. Therefore, improvements in the art are needed.

SUMMARY

In some embodiments, an imaging system for capturing spatial images of biological tissue samples may include an imaging chamber configured to hold a biological tissue sample placed in the imaging system; a light source configured to illuminate the biological tissue sample to activate a plurality of fluorophores in the biological tissue sample; and a plurality of Time Delay and Integration (TDI) imagers configured to simultaneously scan the biological tissue sample, where the plurality of TDI imagers may be configured to separately receive light from different ones of the plurality of fluorophores.

In some embodiments, a method of capturing spatial images of biological tissue samples may include mounting a biological tissue sample in an imaging chamber of an imaging system; directing light from a light source to illuminate an area on the biological tissue sample to activate a plurality of fluorophores in the biological tissue sample; and scanning the biological tissue sample with a plurality of Time Delay and Integration (TDI) imagers configured to simultaneously scan the biological tissue sample, where the plurality of TDI imagers may be configured to separately receive light from different ones of the plurality of fluorophores.

In some embodiments, an imaging system may include a plurality of Time Delay and Integration (TDI) imagers configured to simultaneously scan a biological tissue sample, where the plurality of TDI imagers may be configured to separately receive light from different ones of a plurality of fluorophores.

In any embodiments, one or more of the following features may be implemented in any combination and without limitation. The imaging system may be configured to illuminate the biological tissue sample with light that is shaped similar to a shape one of the plurality of TDI imagers. The system may include a plurality of filters, each of which correspond to one of the plurality of fluorophores. The system may include a filter wheel, where a first filter on the filter wheel may cover a first TDI imager in the plurality of TDI imagers, and a second filter on the filter wheel may cover a second TDI imager in the plurality of TDI imagers. The imaging system may be configured to scan a strip of the biological tissue sample in a first direction, then scan an adjacent strip of the biological tissue sample in a second direction that is opposite of the first direction. The imaging system may be configured to focus the imaging system on the biological tissue sample at a beginning of each strip being scanned. The imaging system may be configured to focus the imaging system continually during operation based on a surface mapping of the biological tissue sample. The imaging system may include a doublet and a cylindrical lens configured to provide Critical-Kholer illumination of the biological tissue sample. The imaging system may include a Powell lens and a collimator to illuminate the biological tissue sample. A motion of the biological tissue sample may be synchronized with an image capture of the plurality of TDI imagers using a trigger signal that is derived by dividing a main clock signal. A light signal may be directed through a first filter onto a first TDI imager in the plurality of TDI imagers using a multiband dichroic mirror. A first fluorophore in the plurality of fluorophores may be received by a first TDI imager in the plurality of TDI imagers, a second fluorophore in the plurality of fluorophores may be received by a second TDI imager in the plurality of TDI emitters, and the first fluorophore and the second fluorophore may have non-adjacent wavelength ranges in the plurality of fluorophores. a light signal received from the biological tissue sample may be directed into a prism to separate the light signal into separate light signals corresponding to different fluorophores in the plurality of fluorophores. First raw image data from a first strip received from the plurality of TDI imagers may be processed while second raw image data is being scanned by the plurality of TDI imagers. The system may include a plurality of filters, each of which may correspond to one of the plurality of fluorophores. The system may include a filter wheel, where a first filter on the filter wheel may cover a first TDI imager in the plurality of TDI imagers, and a second filter on the filter wheel may cover a second TDI imager in the plurality of TDI imagers. The imaging system may be configured to scan a strip of the biological tissue sample in a first direction, then scan an adjacent strip of the biological tissue sample in a second direction that is opposite of the first direction. The imaging system may be configured to focus the imaging system on the biological tissue sample at a beginning of each strip being scanned.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
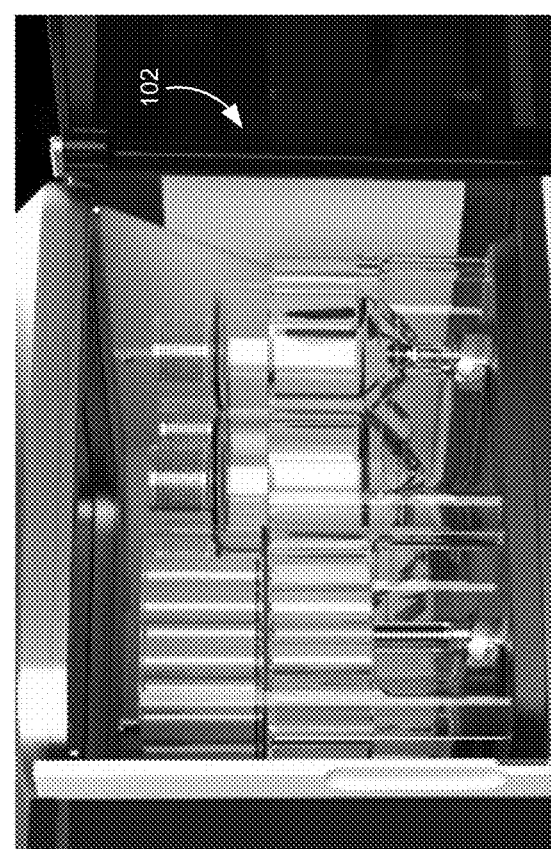
FIG. 1 illustrates a high-resolution biological imaging system, according to some embodiments.
Figure 1:
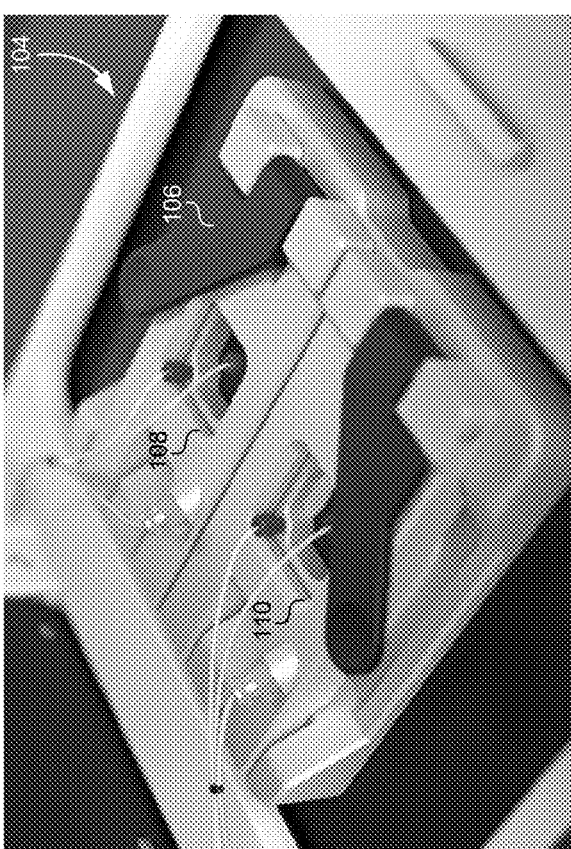
Figure 1:
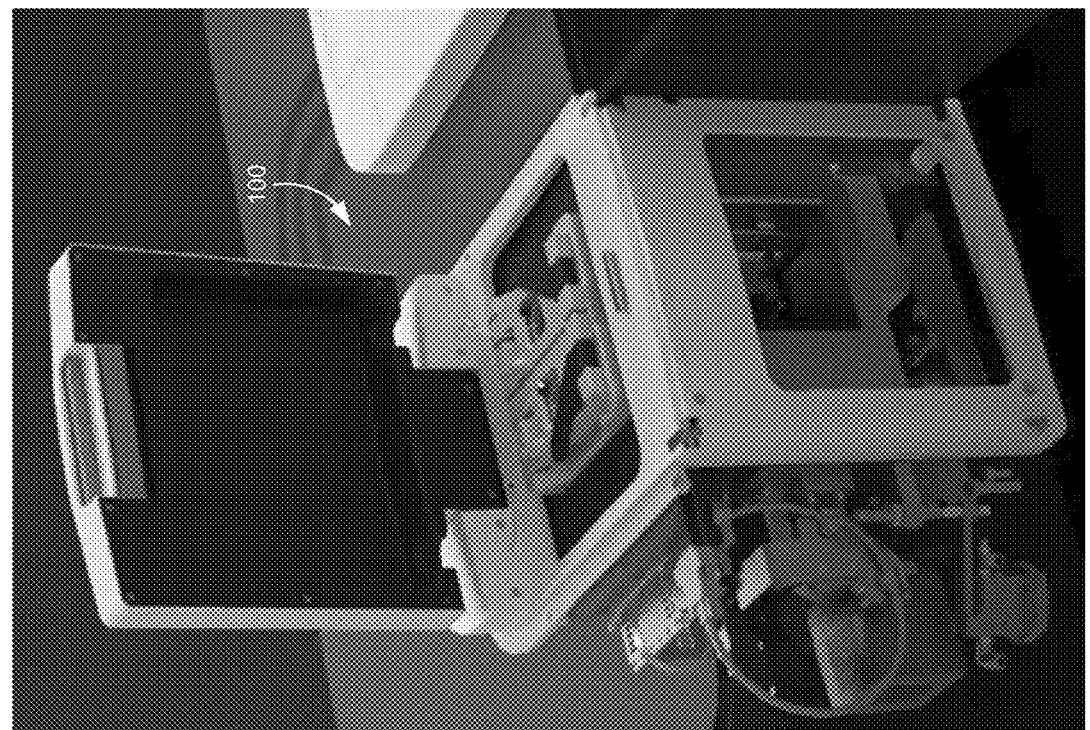

FIG. 1 illustrates a high-resolution biological imaging system 100, according to some embodiments. The imaging system 100 may be configured to combine multiple imaging workflows together into a single process to perform an automated spatial analysis of the tissue sample. The imaging system 100 may include multiple imaging chambers 108, 110, each of which may be configured to perform individual imaging operations on different tissue samples. A fluid system 102 may provide integrated fluid control to provide a plurality of fluorophores and/or other fluids to the imaging chambers 108, 110 during the imaging process. Different fluorophores and reagents may be loaded into containers in the fluid system 102 such that these fluids can be automatically provided to the imaging chambers 108, 110 when needed during the imaging process. In the context of this disclosure, the fluorophores may be attached to one or more binding reagents that specifically interact with one or more analytes in the tissue sample. Exemplary binding reagents include nucleic acid probes, proteins (such as antibodies and antibody derivatives), and aptamers. Thus, where fluorophores are mentioned in this disclosure, it is to be understood that the fluorophores may be present as a component of or attached to one or more binding reagents.

The imaging system 100 may include a computer system comprising one or more processors, one or more memory devices, and instructions stored on the one or more memory devices that cause the imaging system 100 to perform the imaging operations on the tissue samples in the imaging chambers 108, 110. Thus, each of the operations of the imaging process described herein may be represented by instructions stored on the one or more memory devices.

In an example imaging workflow, a user or automated process may load a tissue sample onto a slide, and load the slide into an imaging chamber 108. After securing the tissue sample in the imaging chamber 108, fluids may then be automatically pumped into the imaging chamber 108. For example, some fluids may be pumped into the imaging chamber 108 in order to clean the tissue and/or remove previous fluids or fluorophores that may be present in the imaging chamber 108. New fluids or fluorophores may be provided from the fluid system 102 in an automated fashion, as specified by the instructions executed by the controller. Generally, these "fluids" may more specifically include stains, probes, and other biological labels. During a typical cycle, one or more fluorophores may be pumped into the imaging chamber 108 that are configured to attach to the cells in the tissue sample in order to visually highlight different features within the sample. Corresponding laser wavelengths may then be used to illuminate the sample in the imaging chamber 108 to excite the fluorophores, and a camera may capture images of the illuminated sample. The fluorophores may be matched with different laser wavelengths that are configured to illuminate those specific fluorophores.

After the imaging process is complete, the raw images from the system may be converted into RNA spots or protein spots by the controller. These RNA spots or protein spots may be visualized as cell-type clusters that are highlighted by the different fluorophores. Multiple images may then be merged for a multi-omic analysis of the tissue sample. Software tools provided by the controller of the imaging system 100 may provide different visualizations, data filtering, and analysis tools for viewing the images.

Although the imaging system 100 is described herein as a fully integrated solution, combining control processing, image capture, and fluidics into a single integrated system, other embodiments may use systems that are distributed to some degree. As the imaging speed is increased using the techniques described below, it may become more advantageous to separate portions of the integrated system into distributed subsystems. For example, the fluid operations and the imaging operations need not be integrated into a single integrated tool. Multiple fluid chambers may be connected to a singular, stand-alone imaging tool using a robot or human that transfers material back and forth between the two. Therefore, the term "imaging system" should be construed broadly to encompass both fully integrated and distributed systems.

Figure 2:
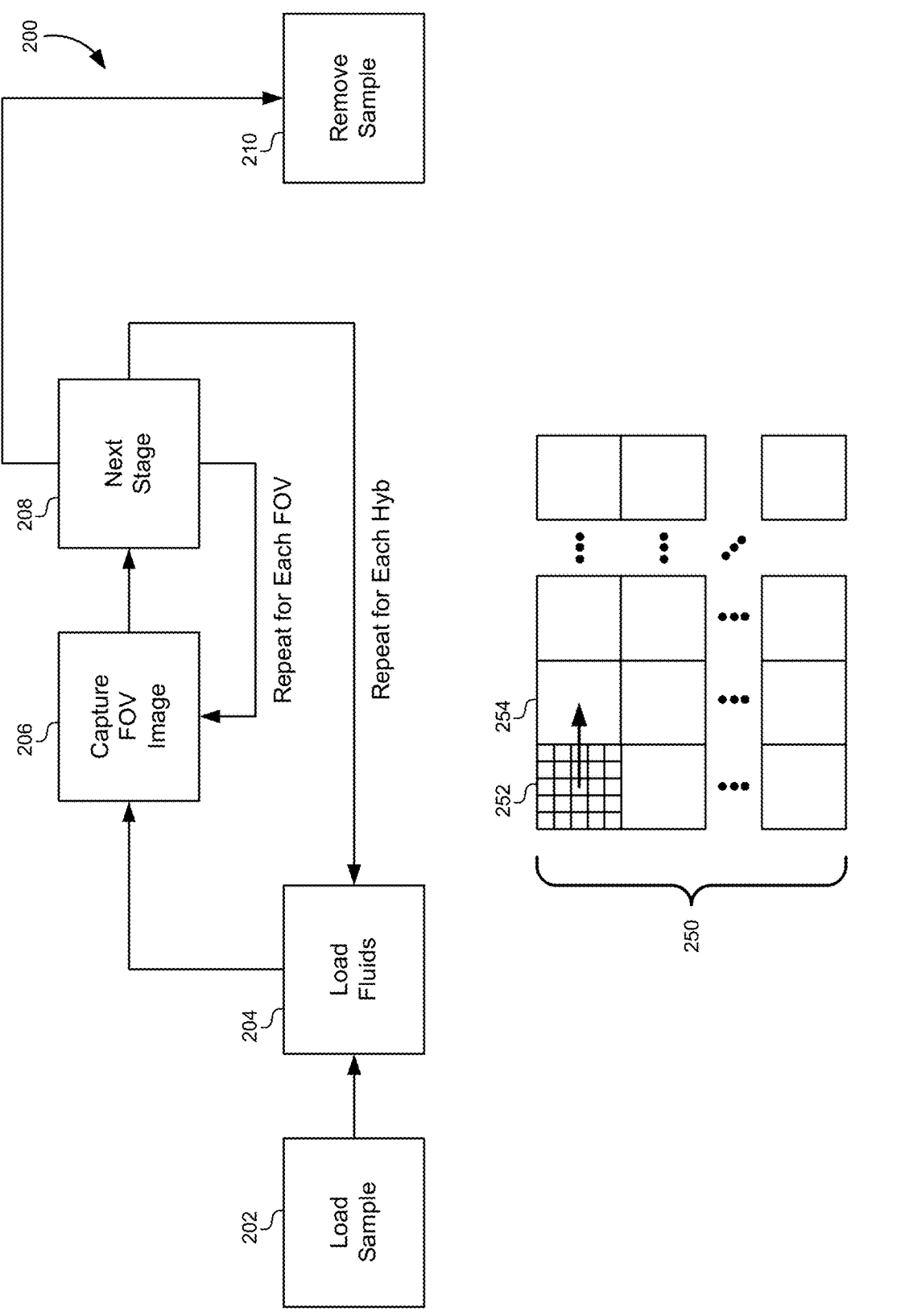
FIG. 2 illustrates a flowchart of a process for capturing spatial images of a sample, according to some embodiments.

FIG. 2 illustrates a flowchart 200 of a process for capturing multi-omic images of a sample, according to some embodiments. As described above, the process may include loading a tissue sample on a substrate, such as a coverslip or a slide, and securing the tissue sample inside one of the imaging chambers of the imaging system (202). Note that multiple stations in the image processes system 100 may operate independently and simultaneously. For example, the imaging chamber 108 may capture images of the sample while another station may exchange fluids with a tissue sample. Some embodiments may also include a photobleaching station. The imaging system 100 may then provide fluids from the fluid system 102 into the imaging chamber 108 (204). These fluids may include fluorophores that are configured to attach to specific cell or tissue types that are to be highlighted in the resulting image.

In order to capture images over a large area with high resolution sufficient to visualize individual cells in detail, the image of the sample may be captured in stages. For example, multiple images may be captured of the sample and stitched together to form an overall image. For example, the overall image 250 may be comprised of multiple sub images that may be captured by the camera at a high resolution. Each of the images may correspond to a field-of-view of the image. Thus, the process may include incrementally capturing a field-of-view image using the camera (206), then moving the camera view to a subsequent location with an adjacent field-of-view and preparing the camera for the subsequent stage (208). This process may be repeated until the overall image 250 of the sample has been captured by the individual field-of-view images.

In order to capture the overall image 250, the field-of-view of the camera may move in a pattern over the tissue sample. For example, a first field-of-view 252 may be captured (206), then the camera may move to a second field-of-view 254 that is optionally sequential and/or adjacent to the first field-of-view 252 in a grid pattern (208). This process may be repeatedly executed for each field-of-view in the sample until the overall image 250 has been captured. Note that the grid pattern illustrated in FIG. 2 is provided only by way of example and is not meant to be limiting. Other embodiments may move horizontally, vertically, diagonally, and/or in any other pattern that may be used to capture individual field-of-view images that may be combined into the overall image 250. The individual fields-of-view may overlap in some embodiments, or may not overlap in other embodiments.

Multiple overall images 250 of the tissue sample may be captured in order to highlight different features in the tissue sample for the overall multi-omic analysis. Therefore, after the overall image 250 is captured for a particular fluorophore or set of fluorophores, the process may be repeated on the same tissue sample with another fluorophore or set of fluorophores. For example, the previous fluorophores may be pumped out of the imaging chamber 108, cleaning or rinsing agents may optionally be pumped through the imaging chamber 108 to clean the tissue sample, and a new set of fluorophores may be pumped into the imaging chamber 108 for the next image (204). Each overall image captured with different fluorophores to be combined in the multi-omic analysis may be referred to as an "imaging cycle" or a "hyb," which is short for "hybridization," in a "fluorophore labelling hybridization cycle." Typically, each sample may be subject to a plurality of hybs using different fluorophores. For example, some embodiments may capture two, three, four, five, six, or more overall images of the sample corresponding to the number of unique fluorophores), thereby repeating the cycle (204) multiple times. When the desired number of images of the sample have been captured, the sample may be removed from the imaging chamber 108 (210). A new sample may then be added to the imaging chamber 108 (202), and the imaging process may be repeated.

At each field-of-view image location, the sample may be illuminated by a plurality of different light wavelengths (e.g., different colors configured to illuminate different fluorophores in the sample), and thus multiple images may be captured at different wavelengths at each location. Additionally, the sample itself may be adjusted axially to capture multiple images at different Z-depth levels, resulting in three-dimensional image slices through the tissue sample. As used herein, the term Z-depth may refer to a distance along a focal line of the camera, which may in some instances may also be perpendicular to the surface of the tissue sample. The tissue samples under analysis are three-dimensional volumes at different Z-depths in a layer of cells (i.e., different distances from the camera or lens within the volume of the tissue sample). Therefore, in order to capture a three-dimensional representation of the tissue sample, the imaging system 100 may capture complete images at different Z-depths by adjusting the focal length of the camera. For example, some embodiments may slice the volume of the tissue sample at 0.5 µm intervals (i.e., images are taken at or about −1.0 µm, −0.5 µm, 0.0 µm, 0.5 µm, and 1.0 µm along the Z-axis). This range, for example, may represent slices all within one layer of cells, where a cell may be about 10 µm to about 30 µm thick. While this process does provide high-resolution, multi-omic image data, this process also takes a considerable amount of time. For example, when capturing images at seven different Z-depths with four different fluorophores, 28 scans through the tissue sample may be used. Each movement from one field-of-view to the next field-of-view include significant overhead that increases the time required to capture each image. The process may include moving the sample laterally such that the camera captures a new field-of-view location, which may require time for acquiring the new images, physically moving the sample using a piezo motor or step motor, configuring the laser and the corresponding filter for the desired wavelength, stabilizing and focusing the camera, and/or other operations. Combining these different factors together causes the overall imaging time to be relatively large. For example, each hyb may take approximately 7 hours to complete in an example implementation using a camera with a 40× objective and a 30×30 grid of field-of-view images to cover the sample. A typical four-hyb session may then take between 30-40 hours total to complete. While reducing the resolution of the camera increases the field-of-view and reduces the total number of field view images required, this also negatively affects the quality of the resulting images. This significant time requirement represents a technical problem in the area of biological spatial omics.

Some embodiments may reduce the overhead of moving the complete field-of-view for the imaging camera and instead use a Time Delay Integration (TDI) camera. The TDI camera may be used to continuously scan the tissue sample in columns rather than moving between different fields of view. The laser beam that is projected onto the imaging sample may be shaped to approximately match the TDI image scan line. Switching to a TDI camera may improve many of the sources of error and overhead challenges listed above. TDI scanning enables a continuous scanning image collection which averages many non-uniformities in the scan direction. This reduces the system sensitivity to many different error sources including illumination non-uniformity, image sensor pixel-to-pixel non-uniformity (and defects), and/or lens aberrations. TDI scans stitch on two sides instead of on four sides, and scanning under constant acceleration may reduce acceleration force ripples that cause vibrations in the tissue sample. Finally, overhead from mechanical movements may be greatly reduced, whereas a system with 100 fields (10×10 square), 4-color, 5-focus will require only 195 over-head events [e.g., (9 scans×4 color+3 color changes)×5 focus].

Figure 3:
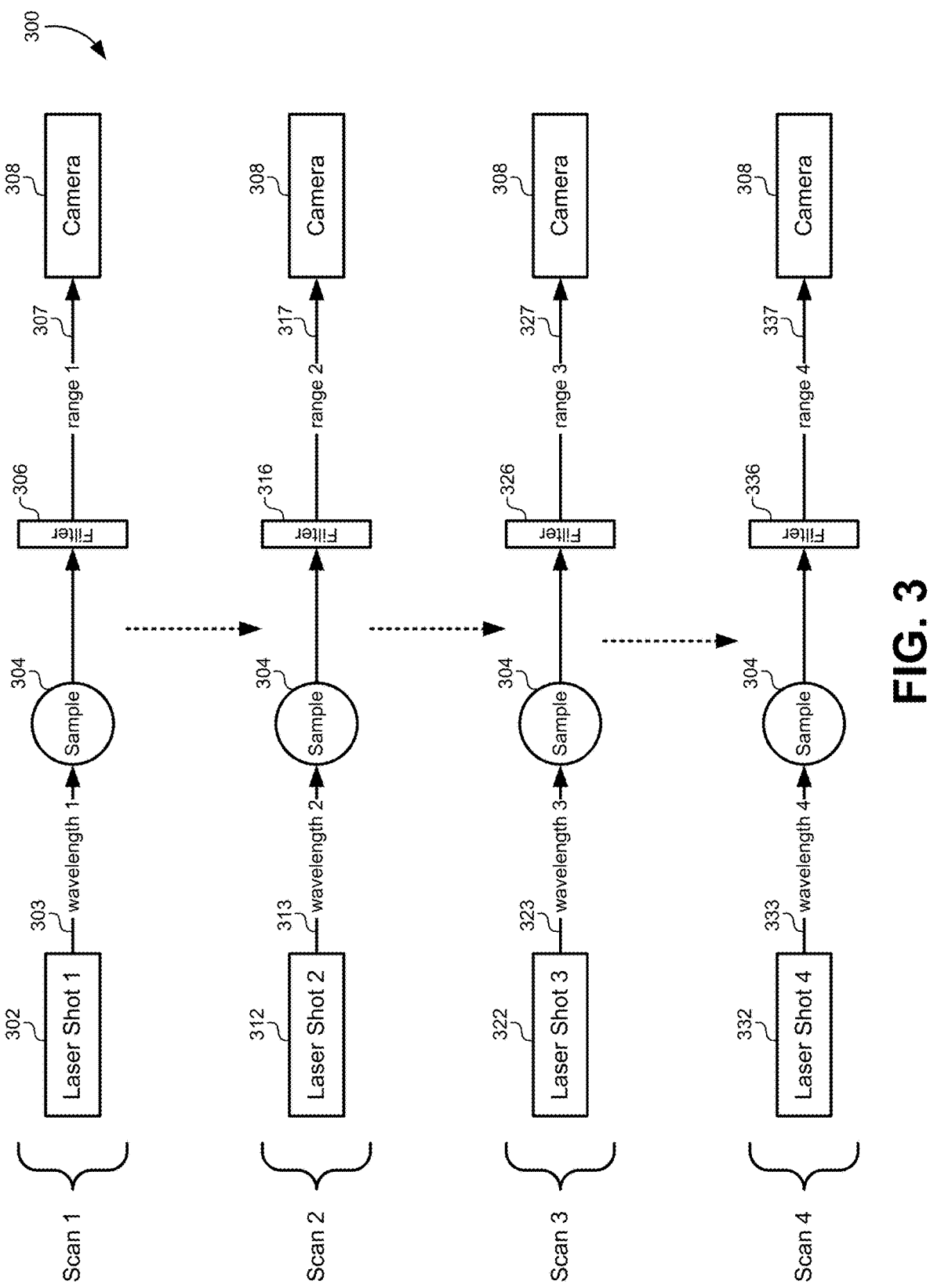
FIG. 3 illustrates how the imaging system may capture a plurality of images illuminated by different wavelengths, according to some embodiments.

FIG. 3 illustrates how the imaging system 100 may capture a plurality of images illuminated by different wavelengths, according to some embodiments. In this example, each area of the tissue sample may be illuminated by four different wavelengths. A first laser shot 302 may illuminate an area of the tissue sample 304 with a first wavelength 303. Reflected light or fluorescence from the first laser shot 302 may pass through a first filter 306 configured to pass a first wavelength range 307 before being recorded by the camera 308. Note that the first wavelength range 307 may represent a composition of the excitation wavelength 302 and the emission wavelength from the sample. The pass band cutoff of the first filter 306 may be higher than the excitation wavelength 302. Therefore, the first filter may block the excitation wavelength 302 and may allow the emission light to be captured by the camera. For example, a fluorophore may be activated at a given wavelength, and the activated fluorophore may emit light within a wavelength range that is greater than the activation wavelength. Similarly, a second laser shot 312 may illuminate the area of the tissue sample 304 with a second wavelength 313. Reflected light or fluorescence from the second laser shot 312 may pass through a second filter 316 configured to pass a second wavelength range 317 before being recorded by the camera 308. A third laser shot 322 may illuminate the area of the tissue sample 304 with a third wavelength 323. Reflected light or fluorescence from the third laser shot 322 may pass through a third filter 326 configured to pass a third wavelength range 327 before being recorded by the camera 308. A fourth laser shot 332 may illuminate the area of the tissue sample 304 with a fourth wavelength 333. Reflected light or fluorescence from the fourth laser shot 332 may pass through a fourth filter 336 configured to pass a fourth wavelength range 337 before being recorded by the camera 308.

Typically, a complete set of field-of-view images may be captured for one each wavelength at each field-of-view location before moving to the next location. Between capturing images at each wavelength, time is required to change the filter wheel, settle the filter wheel, move the motor to account for wavelength-dependent focal plan shifts, and so forth. Therefore, each additional desired wavelength increases the total time for imaging a tissue sample.

Figure 4:
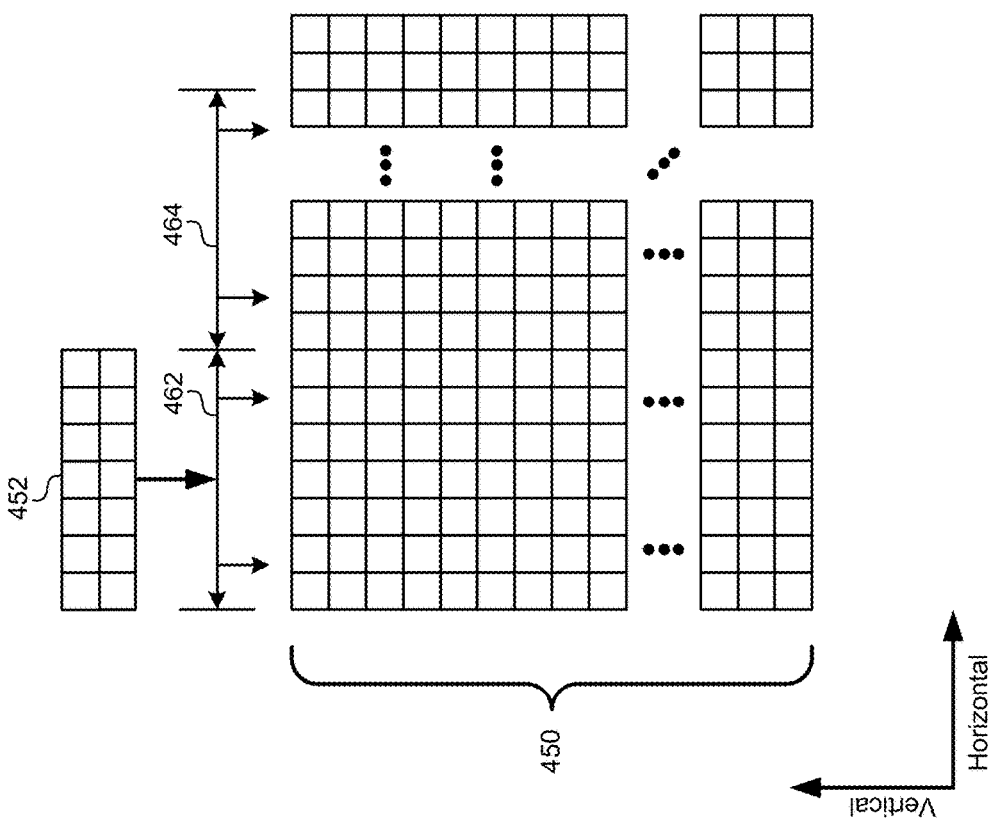
FIG. 4 illustrates a TDI camera that may be used in the imaging system, according to some embodiments.
Figure 4:
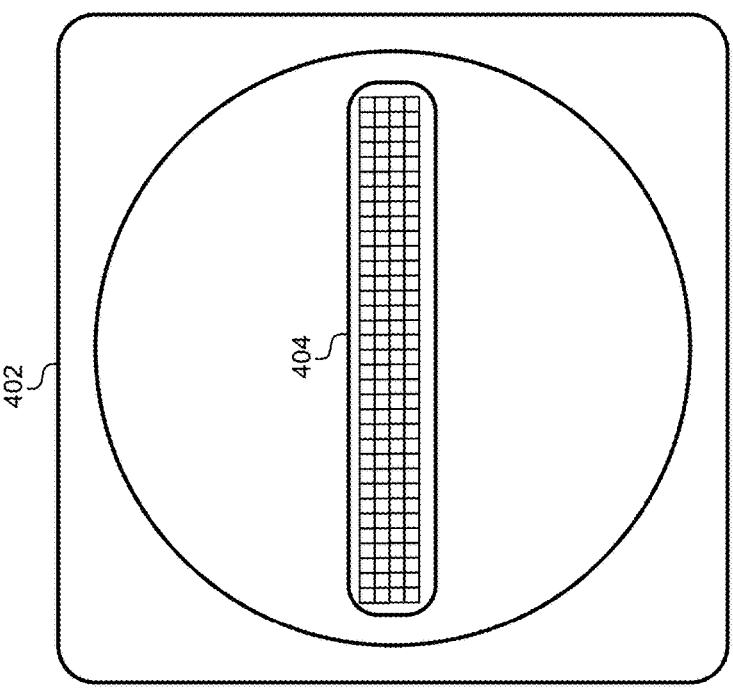

FIG. 4 illustrates a TDI camera 402 that may be used in the imaging system, according to some embodiments. The TDI camera 402 may include a charge-coupled device (CCD) or a CMOS photon-detecting device as an image sensor for capturing images. For example, the TDI camera 402 may include a scan line 404 of individual CCD pixels in a horizontal configuration as depicted in FIG. 4. Note that only a single partition of pixels is illustrated in this scan line 404 for the sake of clarity. However, this is not meant to be limiting. As discussed and shown below, TDI cameras 402 may include multiple horizontal rows of pixels organized into one or more partitions.

The operation of the TDI camera 402 may be contrasted with the operation of the traditional camera described above. As described above, traditional cameras may capture a single field-of-view, and then move to another, nonoverlapping field-of-view before capturing the next image. Turning back briefly to FIG. 2, a field-of-view 252 may include a horizontal grid of individual pixels within the field-of-view 252, and each of the individual pixels will capture the image simultaneously when the camera shot is acquired. In contrast, the TDI camera 402 may use the scan line 404 of individual pixel rows. The TDI camera 402 may continuously scan in the vertical direction over the image sequentially. The movement of the tissue sample and/or TDI camera 402 may be synchronized such that images are captured at each pixel step. The last horizontal line of pixels in the scan line 404 may accumulate and average the individual pixels to output an average reading for that scan location. The whole image may then be assembled from the equally spaced lines through the linear field-of-view of the scan line 404. Note that the terms "horizontal" and "vertical" are used merely to denote orthogonal directions as illustrated in FIG. 4 and are not meant to be limiting to a specific direction.

The scan line 404 need not extend the entire horizontal length of the image. Instead, multiple vertical "columns" may be captured using multiple vertical continuous scans. For example, to capture an overall image 450, a scan line 452 may continuously scan down a first vertical column 462 of the imaging area. When the scan of the first vertical column 462 is completed, the scan line 452 of the TDI camera may be repositioned over a second vertical column 464, and the scan line 452 may then continuously scan down the second vertical column 464. These vertical columns may be stitched together to form the overall image 450 of the tissue sample.

Use of the TDI camera 402 represents a significant technical improvement over other cameras in scanning tissue samples. The TDI camera 402 may continuously capture each vertical scan column, which eliminates the need to mechanically reposition the sample, stabilize, focus, and prepare for each individual field-of-view capture. Instead, the TDI camera 402 may move at a constant speed in the vertical direction and scan continuously to accumulate the reflected light or fluorescence signals from the tissue sample. The only repositioning that needs to occur for the TDI camera 402 may be in between each of the vertical column captures.

Figure 5:
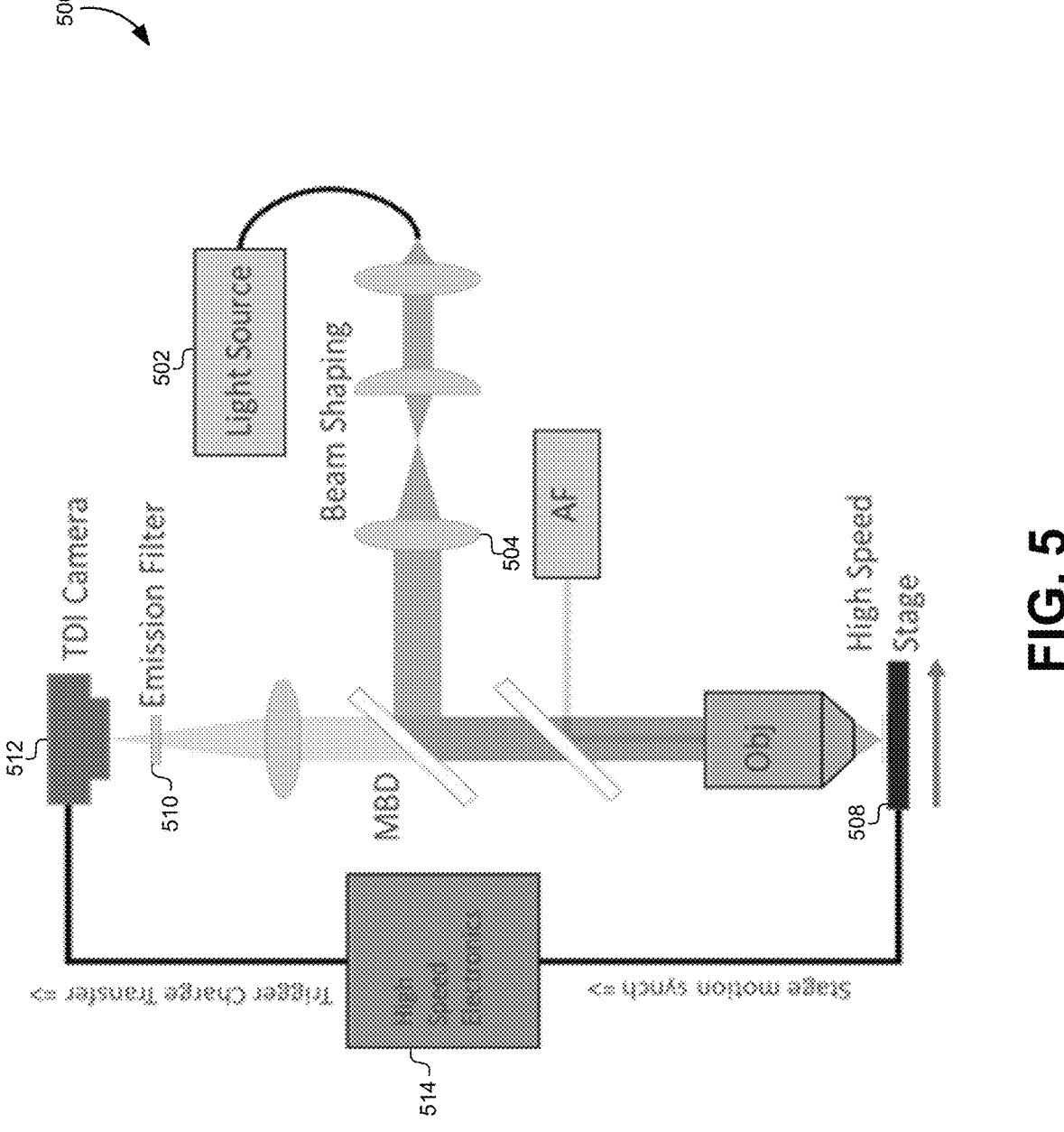
FIG. 5 illustrates a system diagram for the imaging system, according to some embodiments.

FIG. 5 illustrates a system diagram 500 for the imaging system 100, according to some embodiments. The imaging system 100 can be roughly divided into three subsystems, namely the image capture subsystem, the fluidics subsystem, and the processing subsystem. The system diagram 500 illustrates the image capture subsystem. After a biological tissue sample has been secured in the imaging chamber, the image capture subsystem in the system diagram 500 may operate to capture a complete, three-dimensional set of images of the tissue sample.

As described above, a TDI imager 512 may replace the conventional CMOS/CCD sensor camera in the image subsystem. Using the TDI imager 512 allows the system to capture continuous scans over columns of the tissue sample rather than performing a stop-and-go capture sequence for each field-of-view. Therefore, the image capture subsystem does not simply substitute the TDI imager 512 for the conventional CMOS/CCD sensor camera, but it also changes the operation, timing, and sequence of image capture. Specifically, the system uses the TDI imager 512 to capture high-speed images of the tissue sample by scanning columns of the image and stitching together these column images side-by-side to construct the entire image. This reduces the post-processing time required to construct the image and significantly reduces the time required to capture the images of the tissue sample.

Figures 6A, 6B:
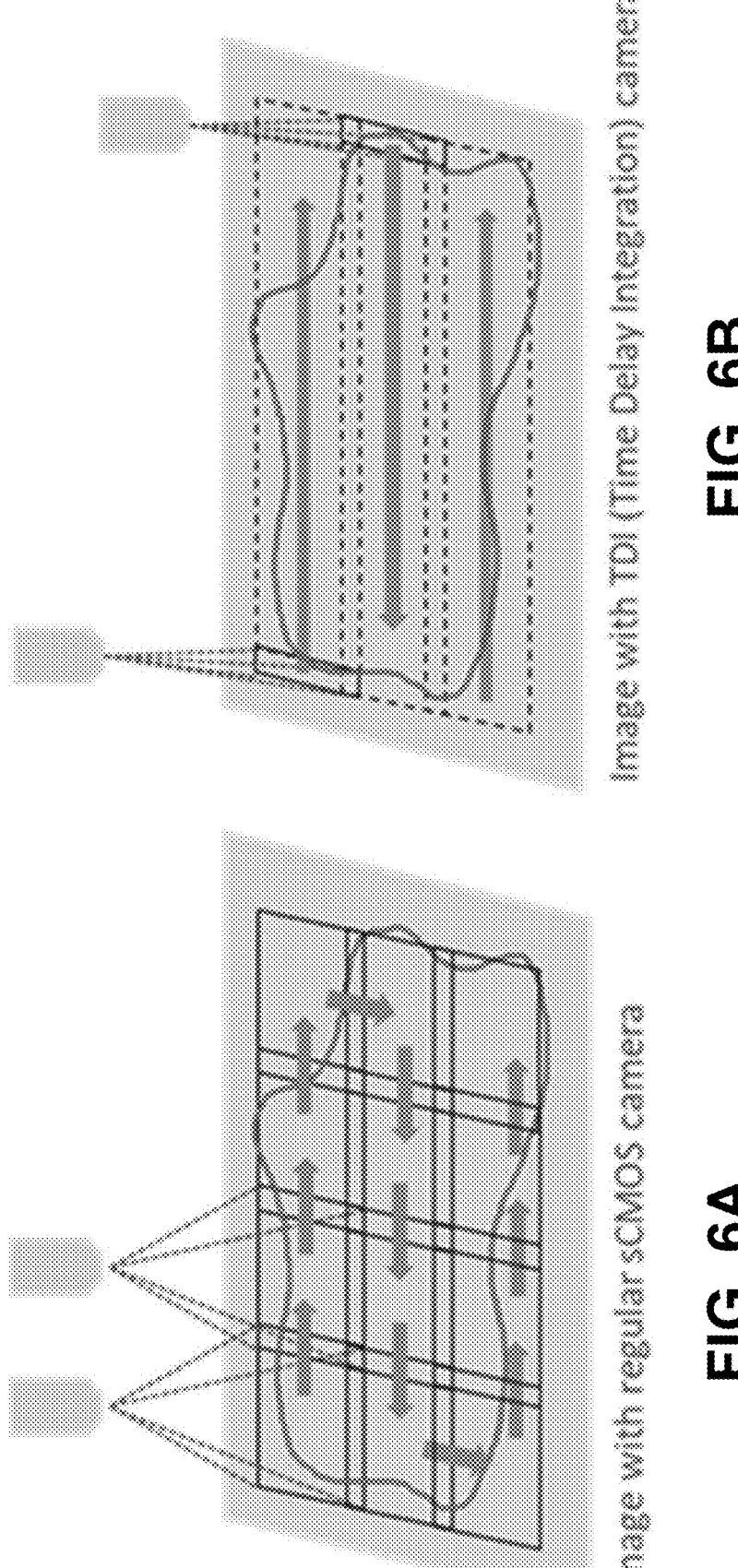
FIG. 6A illustrates an image-acquisition sequence using a regular CMOS/CCD imager that moves from frame to frame, according to some embodiments.
FIG. 6B illustrates a scan pattern that may be used by a TDI imager, according to some embodiments.

FIG. 6A illustrates an image-acquisition sequence using a regular CMOS/CCD imager that moves from frame to frame, according to some embodiments. With each movement between each field-of-view, the overhead operations described above (e.g., camera focus, tissue settlement, etc.) take place, which greatly increases the total time for capturing the image. Additionally, the resulting number of individual images is quite large, which in turn requires a large amount of processing time to trim and stitch the images together to form the overall image.

FIG. 6B illustrates a scan pattern that may be used by a TDI imager, according to some embodiments. Instead of incurring the overhead of moving the camera between each field-of-view, the scan path of the TDI imager may scan full columns back and forth across the tissue sample until the entire sample has been imaged. The camera-movement overhead operations may only need to be performed with each column. The resulting number of individual column images is small compared to the number of images illustrated in FIG. 6A. Thus, the resulting processing time required to trim and stitch the images together to form the overall image is greatly reduced.

Turning back to FIG. 5, a light source 502 generates a predetermined wavelength that corresponds to at least one of the fluorophores present in the tissue sample. The light source 502 is directed through a beam shaping system 504 to shape the light beam to correspond to the area on the tissue sample that is captured by the TDI imager 512. As illustrated above in FIG. 4, the TDI imager 512 may include one or more partitions of horizontal pixel rows. In contrast to the conventional CMOS/CCD sensor cameras, the partitions in the TDI imager 512 may be longer horizontally than vertically (e.g., a partition may include 128 rows of 2048 pixels). Therefore, the beam shaping system 504 may shape the light beam to match the size and shape of the area viewed by the TDI imager 512 on the tissue sample. This reduces the amount of light wasted by projecting light onto portions of the tissue sample that are not being imaged. This also prevents the overexposure of fluorophores in neighboring portions of the tissue sample. As described below, the beam shaping system 504 may include lenses that shape the beam, and/or fiber-optic lines with geometric shapes that control the output shape of the light beam.

The shaped light beam may then be projected onto the tissue sample 508 secured in a slide, coverslip or other apparatus as described below. Electronics 514 may control the movement of the tissue sample 508. For example, the electronics 514 may control one or more motors that move the tissue sample 508 in a direction perpendicular to the pixel rows of the TDI imager 512. As described below, the electronics 514 may use optimized patterns to minimize the refocus time for each image column scanned by the TDI imager 512. The electronics 514 may also be synchronized with the TDI imager 512. For example, as the tissue sample 508 moves, the motors may be synchronized with the line rate of the TDI imager 512.

When the light source 502 illuminates the tissue sample 508, fluorophores that correspond to the wavelength of the light source 502 may be excited. These fluorophores may then emit light in a wavelength range that is slightly greater than the wavelength of the light source 502. The light emitted from the fluorophores is then captured and transmitted back to the optical train of the image capture subsystem. In order to simultaneously capture light emitted in different wavelength ranges by different fluorophores, one or more multiband dichroic mirrors to reflect excitation wavelengths to sample and transmit the emission wavelengths to the TDI imager. Multiband dichroic mirrors may be used as light guiding optics, intended to reflect a specified range of wavelengths and transmit a different specified range of wavelengths. Multiband dichroic mirrors may also aid in filtering out spurious light signals. These optics are described in detail below in FIG. 12. An emission filter 510 may be rotated in front of the TDI imager 512 that corresponds to the wavelength range emitted by the target fluorophores. This prevents spurious light from other sources and light emitted from other fluorophores that may be unintentionally activated in the tissue sample from being captured by the TDI imager 512. The TDI imager 512 continuously captures these images as the electronics 514 move the tissue sample 508 along the scan column.

Figure 7:
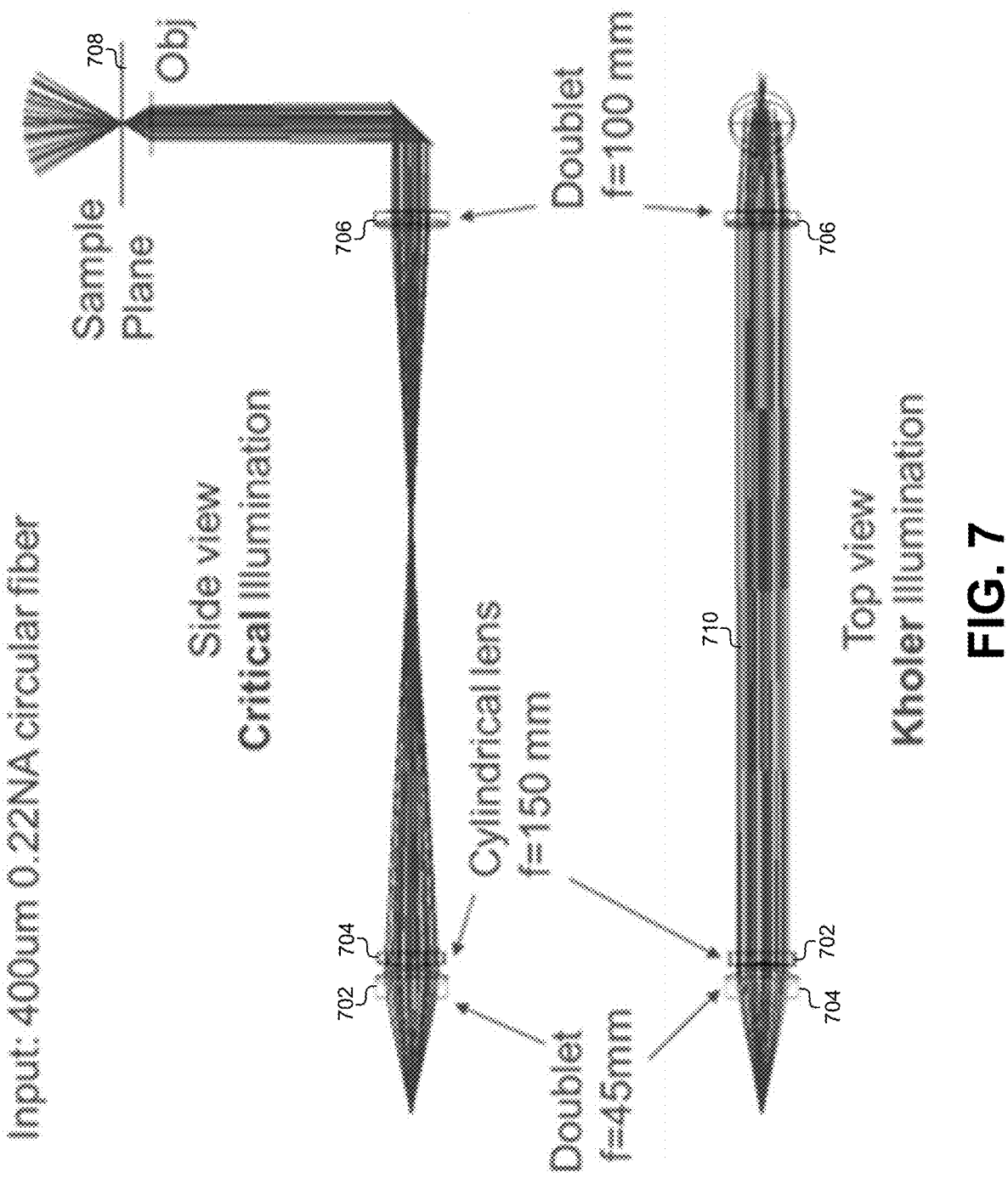
FIG. 7 illustrates a Critical-Kholer hybrid illumination scheme for the TDI imager, according to some embodiments.
Figure 8:
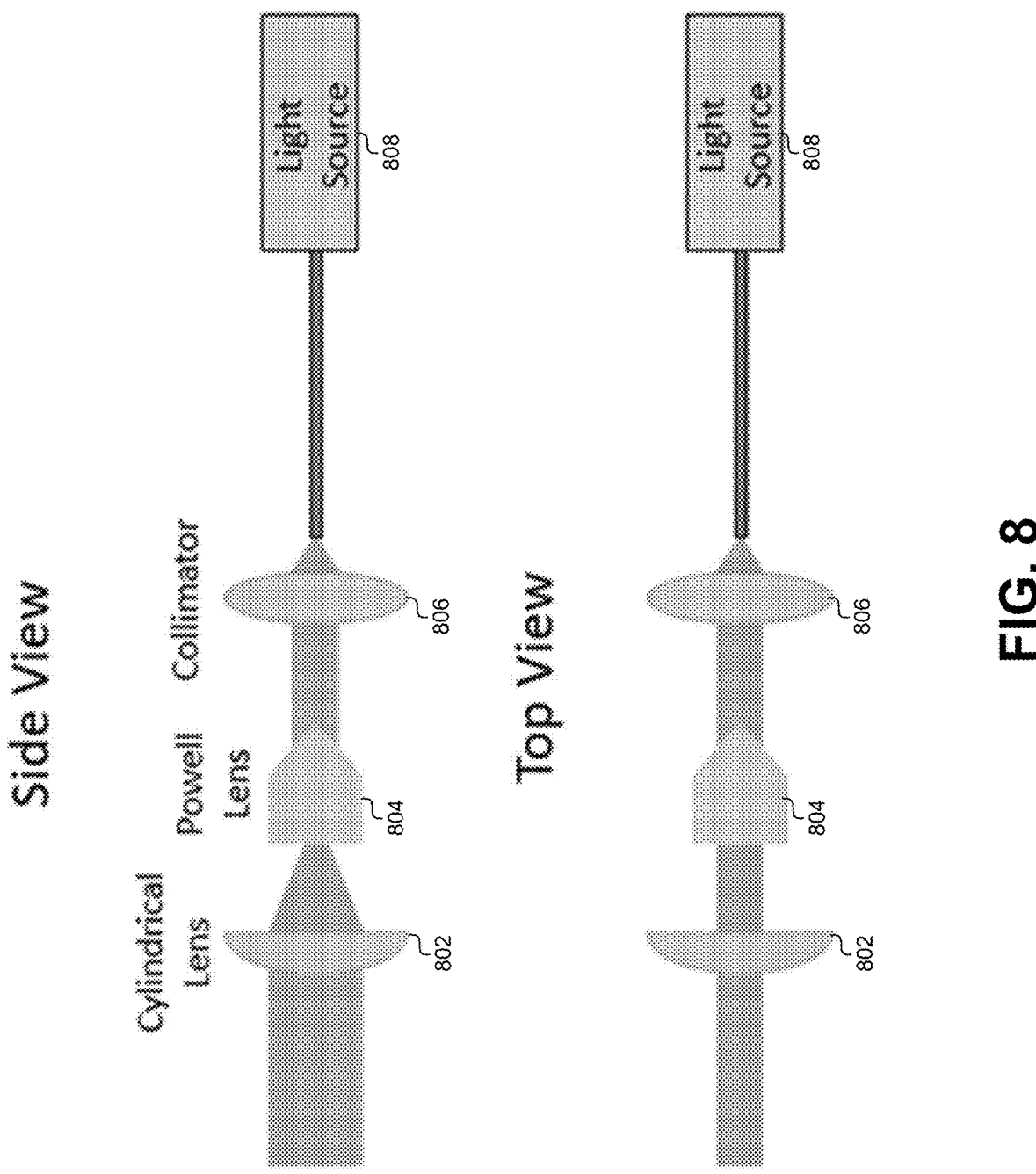
FIG. 8 illustrates a Powell lens illumination scheme for the TDI imager, according to some embodiments.

FIGS. 7-9 illustrate techniques for the image capture subsystem to generate light beams that conform to the viewable area of the TDI imager. As described above, the area of the TDI imager is typically rectangular in shape, having significantly more vertical columns than horizontal rows of pixels. Traditionally, the light output incident on the tissue sample was round to capture the entirety of the approximately square-shaped field-of-view for the CMOS/CCD sensor camera. However, in order to tailor the light output to the field of view of the TDI imager, the light output may be shaped by using lenses or shaped fiber-optic fibers as follows.

FIG. 7 illustrates a Critical-Kholer hybrid illumination scheme for the TDI imager, according to some embodiments. In this configuration, the illumination path may include a first doublet 702, a cylindrical lens 704, and a second doublet 706, along with other components not explicitly shown in FIG. 7. In the x-z plane (side view) illustrated at the top of FIG. 7, the optical train may be in a Critical illumination configuration, where the image of the fiber tip (400 um) is de-magnified, for example, by 3× to about 133 μm. In the y-z plane (top view) illustrated at the bottom of FIG. 7, the train may be in a Kholer illumination configuration, where the angular distribution of the beam coming from the fiber (e.g., a 0.22 NA fiber) is mapped to the long dimension of the TDI imager. This particular design enables, for example, a 133×1980 μm illumination spot on the tissue sample to match the thin aspect ratio of the TDI imager. Note that the values for the first doublet 702, the cylindrical in the 704, the second doublet 706, and the fiber illustrated in FIG. 7 are provided only to illustrate one enabling example. These values are not meant to be limiting, and may be adjusted in order to match the size of any particular TDI imager.

FIG. 8 illustrates a Powell lens illumination scheme for the TDI imager, according to some embodiments. In this configuration, a Powell lens 804 may be used to generate a uniform laser line. After being emitted by a light source 808 configured to generate a specific light wavelength, the light beam may be collimated before being incident on the Powell lens 804 using a collimator 806. The beam may be stretched into a uniformly illuminated straight line in one dimension. In the x-z plane (side view) illustrated at the top of FIG. 8, the beam may be altered by the Powell lens 804, while in the y-z plane (top view) illustrated at the bottom of FIG. 8, the beam may remain unaffected. One or more cylindrical lenses 802 may also be used to shape the laser line into the required aspect ratio to match the aspect ratio of the TDI imager.

Figures 9A, 9B:
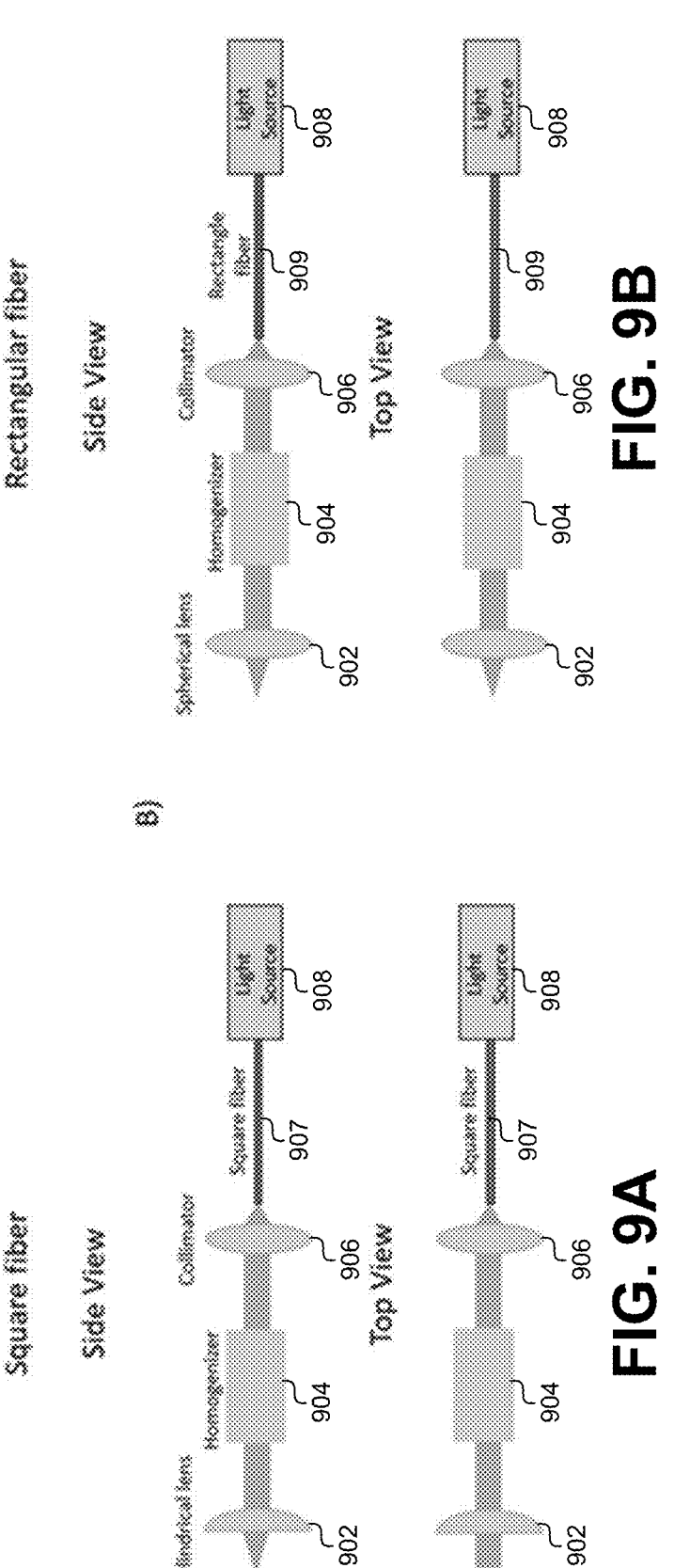
FIGS. 9A-9B illustrate using a geometry of a fiber to shape the light to match the TDI imager, according to some embodiments.

FIGS. 9A-9B illustrate using a geometry of a fiber to shape the light to match the TDI imager, according to some embodiments. As described above in FIG. 8, a collimator 906 and a cylindrical lens 902 may be used in the illumination path. Instead of the Powell lens 804 used in FIG. 8, a homogenizer 904 (or light pipe, or free-form optic) may be used to create a uniform intensity distribution in a flat top beam. Additionally, some embodiments may include a diffractive optical element (DOE) that can be used to convert the collimated illumination beam into a laser line. In FIG. 9A, a square fiber 907 may be used to primarily shape the beam from the light source 908, and FIG. 9B may use a rectangular fiber 909. Note that these particular geometries are provided only by way of example and are not meant to be limiting. Other geometries may be used for the fiber based on the shape of the TDI imager.

Figure 10:
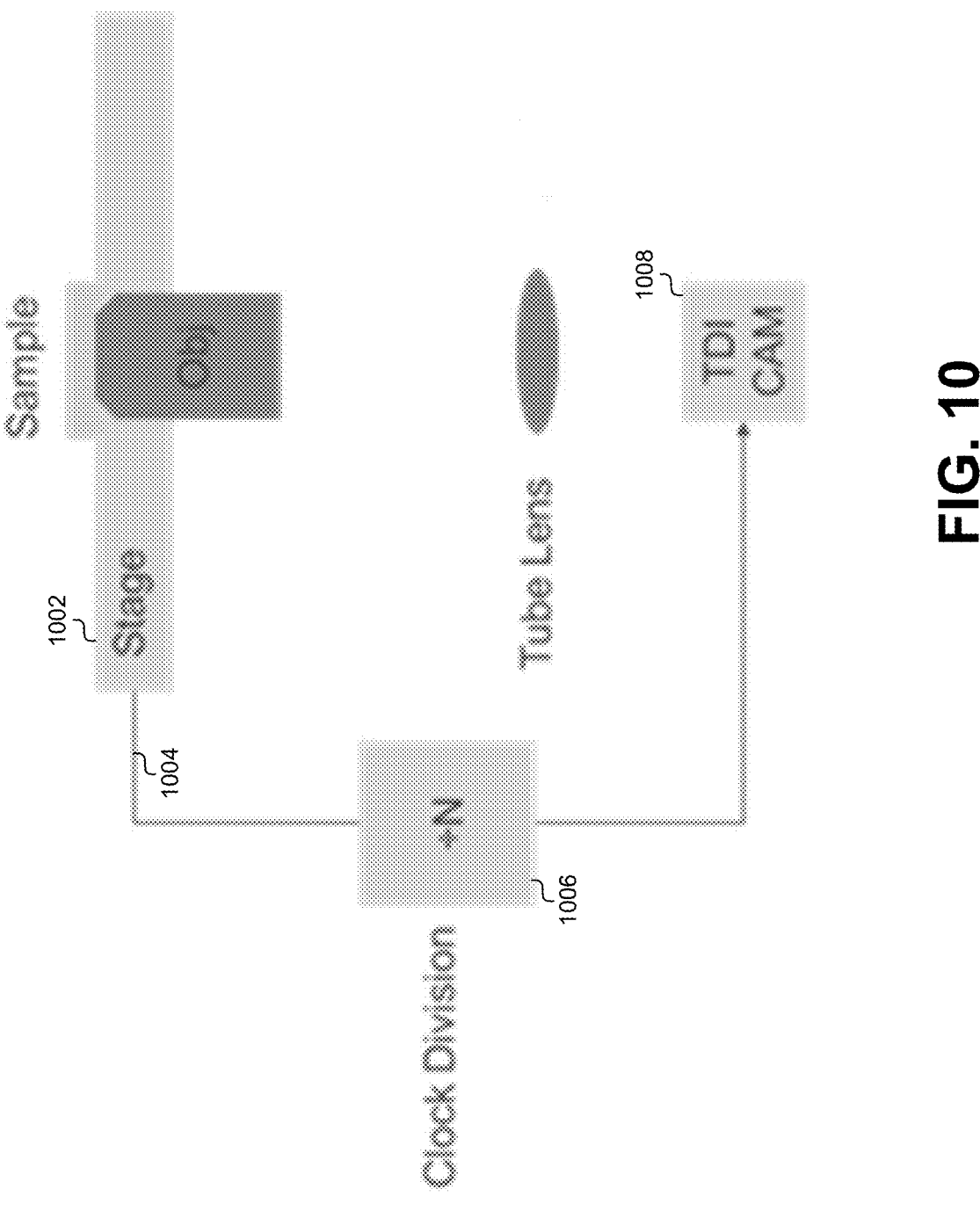
FIG. 10 illustrates a technique for synchronizing the stage synchronization and TDI imager readout, according to some embodiments.

FIG. 10 illustrates a technique for synchronizing the stage synchronization and TDI imager readout, according to some embodiments. In some embodiments, the imaging system may not synchronize the readout of the TDI imager with the movement of the sample. This allows the system to move the sample at any speed, being unrestricted by the readout of the TDI imager. However, this tends to degrade the image quality because the TDI readout and the movement of the tissue are out of sync. Some pixels may be exposed more than others, leading to possible nonuniformity issues.

In order to avoid these problems with unsynchronized readout, some embodiments may instead synchronize the readout of the TDI camera with the movement of the sample. Ideally the TDI imager may be synchronized with the stage movement of the sample using hardware triggering, where movement corresponding to one pixel space by the sample will trigger the readout of the TDI imager using a hardware signal from the controller to the TDI imager. However, there are cases when hardware triggering may not be feasible due to the non-integer relationship between the camera pixel size (on the sample) and stage encoder resolution. In these situations, a direct clock division may not be feasible. Instead, a free-run mode TDI imager may be used to circumvent this issue. The free-run mode may be implemented by running the TDI imager with a preset exposure time, then calculating the required stage speed based on the camera exposure. For example, the stage speed (v) may be calculated as:

$$v = \frac{(\text{Size}_{pixel} \times \text{Rows})}{\tau M}.$$

In this equation, $\text{Size}_{pixel}$ represents the size of the TDI imager pixel (µm), Rows represents the number of rows on the TDI imager, $\tau$ represents the exposure time, and M represents the system magnification factor.

Hardware triggering may pose restrictions on the selection of a TDI imager, the stage encoder resolution, and the system magnification. For example, the formula below may ideally result in an integer value for N:

$$N = \frac{\text{Size}_{pixel}}{rM}.$$

In this equation, r represents the stage encoder resolution. If the camera pixel size is predetermined (e.g., 12 µm, 7 µm, etc.), and the system magnification has limited options (e.g., 10×, 20×, 30×, 40×, etc.) the stage encoder resolution may need to be selected to result in an integer clock division. For example, for a 12 µm pixel size a 25 nm stage encoder resolution may be more desirable to result in a integer clock division compared to 40 nm.

FIG. 10 illustrates an example using hardware triggering of the TDI imager. Specifically, hardware triggering may be used in order to ensure precise synchronization between the TDI imager and the microscope sample stage. Here, the linear encoder is the trigger source, and it may output a single pulse every 40 nm of movement. At a constant movement speed, the stage 1002 outputs a constant clock signal 1004. This clock signal may be the master clock signal for the encoder stage operating at a predefined frequency. This clock signal is then divided down by a hardware counter 1006, then fed to the TDI imager 1008 for triggering. For example, the clock division as N=12 µm/(40 nm×M), where 12 µm is the camera pixel size, M is the magnification factor of the microscope. For example, when M=20 and r=40 nm, N may be calculated to be 15.

Figure 11:
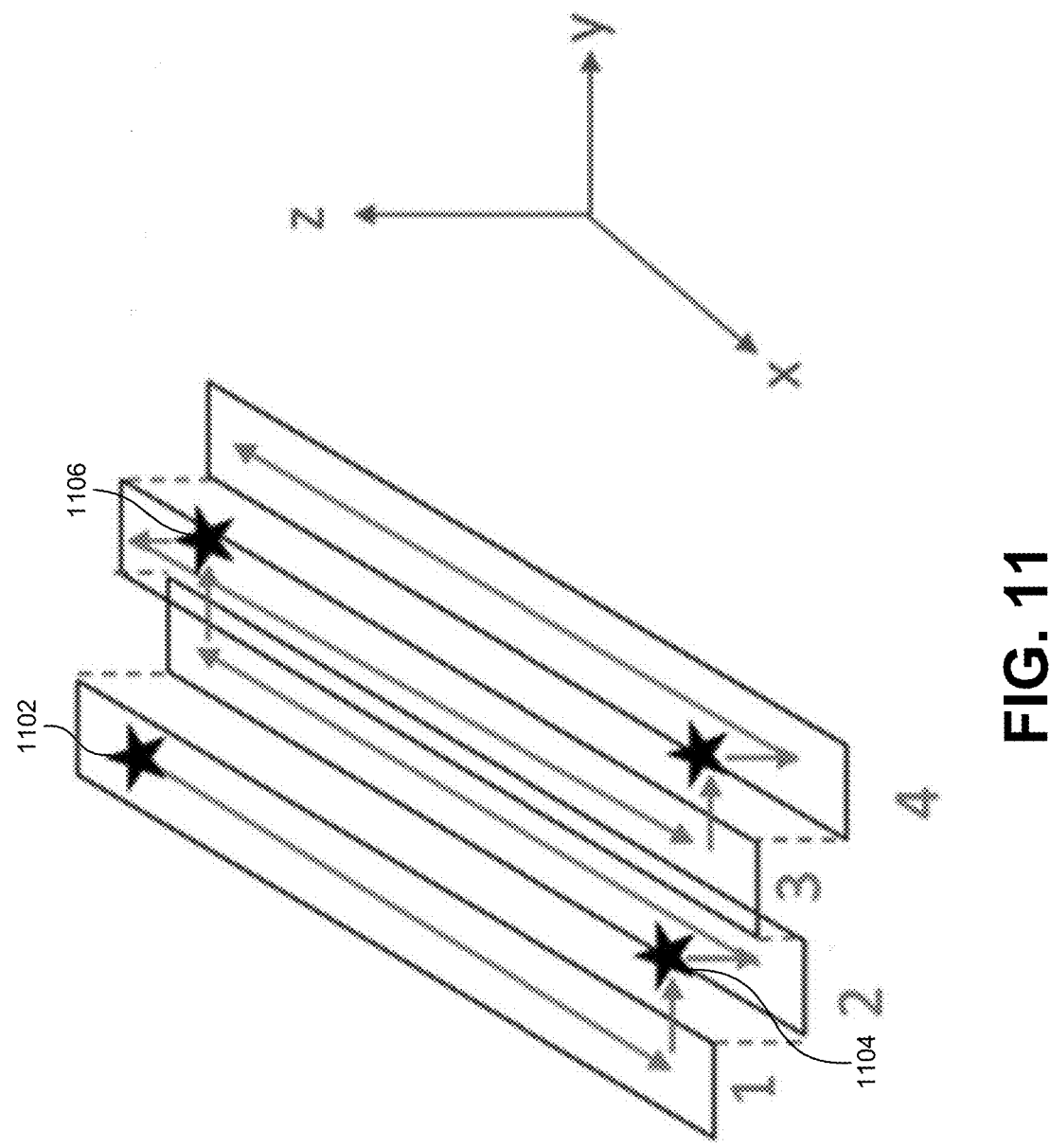
FIG. 11 illustrates focus compensation for sample surface variation, according to some embodiments.

FIG. 11 illustrates focus compensation for sample surface variation, according to some embodiments. When using traditional CMOS/CCD imagers that move field-of-view by field-of-view, the imager would be refocused after each movement to correspond to each new field-of-view. If surface variations were present in the sample, these surface variations would be accounted for wherein the focus operation took place for the imager. However, using a continuous scan operation with a TDI imager presents additional challenges to maintain the focus of the imager despite surface variations in the tissue sample. Depending on the alignment method and design tolerance, the imaging height variation can be significant over large image area if the sample-to-objective lens distance is not actively controlled. Typical "real-time" focusing systems are not fast enough to track sample surface or compensate for stage flatness in high-speed scanning. Specifically, when using higher scan speeds, it is very difficult to autofocus continuously during the movement because the focusing mechanism often has difficulty responding fast enough to focus during the higher scan speeds.

Some embodiments may simplify the process to focus the TDI imager once to image the entire tissue sample. This may be acceptable for tissue samples where there is a limited tilt between the plane of the tissue sample and focal plane of the TDI imager. This may also be acceptable for tissue samples with limited surface variations. However, typical tissue samples having variable surfaces and small tilt differences between the tissue sample and the focal plane of the imager may cause the image to blur without periodic refocusing operations.

As illustrated in FIG. 11, some implementations may refocus at the beginning of each scan column. For example, when scanning the first column the TDI imager may perform a focus operation at location 1102. The TDI imager may then scan the first column in its entirety. The sample may then be moved to sample the second column, where the TDI imager may perform a second refocus operation at location 1104. This system may work well when a tilt only exists in the Y direction between the sample and the imager. However, a tilt in the X direction may still cause focus problems along the length of the scan column. As illustrated in FIG. 11, a tilt in the X direction may result in refocusing the imager at a lower level at location 1104, resulting in a discontinuous image.

Some embodiments may only refocus on the same edge of the sample, thereby removing the discontinuities. For example, the imager may refocus at location 1102, then next refocus at position 1106, without refocusing at location 1104. However, a tilt in the X direction may still result in a loss of focus towards the far end of the sample away from location 1102 and position 1106.

Some embodiments may use surface mapping to map the topology of the surface of the sample prior to the imaging scans taking place. Recall from the discussion above that multiple scans through the tissue sample may take place in order to capture images of different fluorophores in different focal planes within the tissue sample for a 3D view. Before the scans take place, the surface of the sample may be mapped (e.g., with a displacement sensor to determine a distance between locations on the tissue sample and the imager. This displacement map may then be used during subsequent scans of the tissue sample to adjust a focus lens or collimator in real time as the TDI imager scans the sample. Alternatively some embodiments may use a closed-loop auto-focus system that tracks the focal plane of the sample in real time and makes similar adjustments to focus of the imager during the scan.

Figure 12:
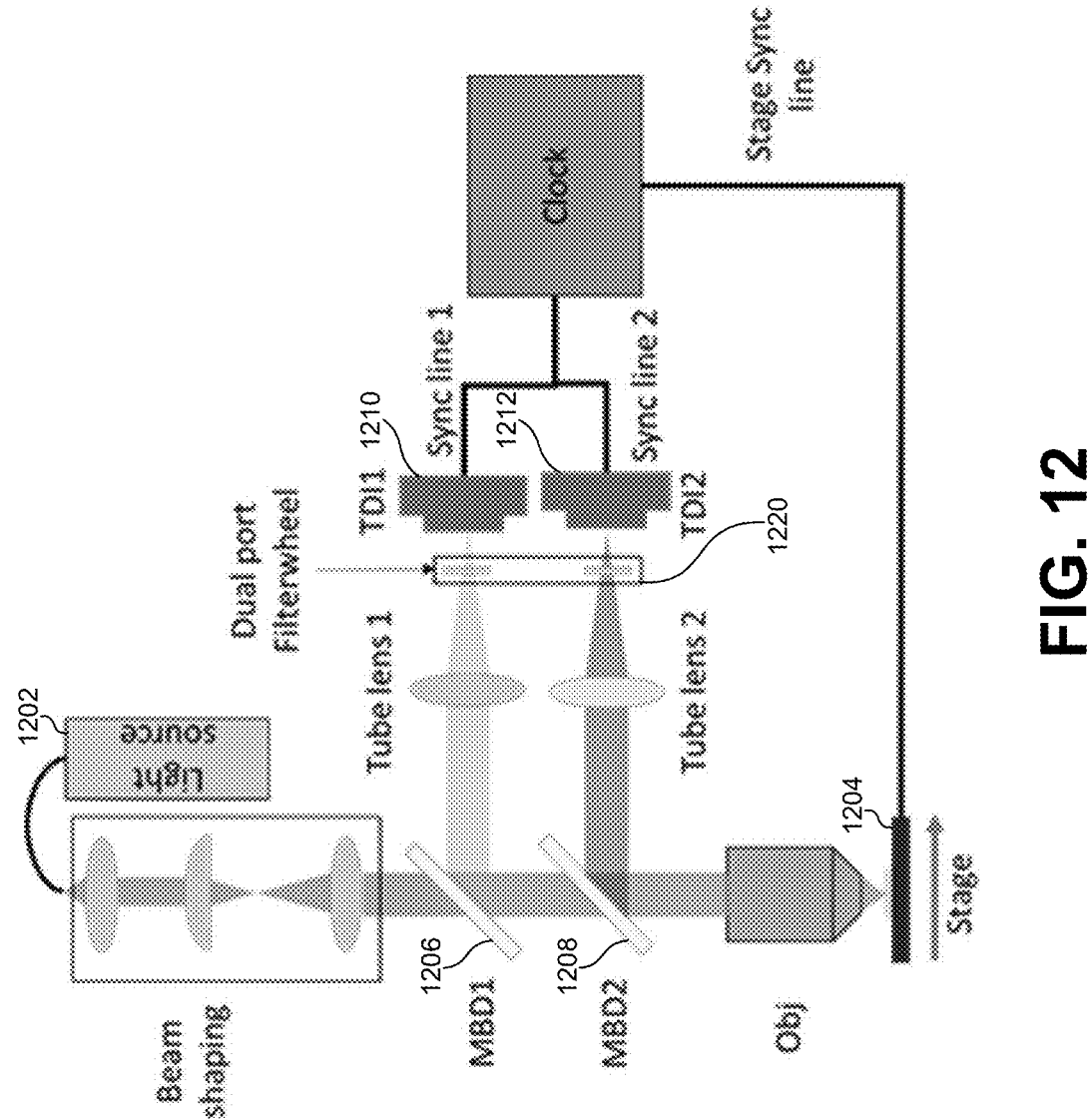
FIG. 12 illustrates a diagram 1200 of an imaging system that acquires images concurrently from multiple TDI imagers, according to some embodiments.

FIG. 12 illustrates a diagram 1200 of an imaging system that acquires images concurrently from multiple TDI imagers, according to some embodiments. As described above, multiple fluorophores may be present in the sample during each imaging session. Light sources may apply light having different wavelengths to separately activate each of the different types of fluorophores in the sample. Filter windows may be placed over the TDI imager to capture only wavelengths in the desired range corresponding to the activated fluorophore. However, because each fluorophore uses a different wavelength for activation and a corresponding different filter on the TDI imager, multiple scans may be needed in order to capture images of all the fluorophores present in a sample.

To improve the throughput of the imaging system, some embodiments may use multiple TDI imagers to simultaneously capture multiple wavelength ranges from different fluorophores in the sample. The multi-wavelength light source 1202 may illuminate a sample 1204 at multiple wavelengths at the same time. The returned fluorescence signals may then be separately received from the sample 1204 in wavelength ranges corresponding to the activated fluorophores. These multiple wavelengths may then be directed into multiple TDI imagers by multiband dichroic mirrors (MBDs). For example, when illuminating the sample 1204 with two different wavelengths to excite two different fluorophores, a first MBD 1206 and a second MBD 1208 may send the light from these fluorophores from the combined light received from the sample 1204 into two different optical paths.

These multiple wavelength ranges may be separately received for each fluorophore at a different TDI imager. In the example of two different fluorophores, a first TDI imager 1210 and a second TDI imager 1212 may receive these different light signals, respectively. The first TDI imager 1210 and the second TDI imager 1212 may be physically separate and distinct camera systems. Alternatively, the first TDI imager 1210 and the second TDI imager 1212 may be implemented using several partitions in the same TDI imager.

Each of the multiple TDI imagers may have a corresponding emission filter placed in front of the TDI imager corresponding to the desired wavelength. For example some embodiments may place an independent filter wheel in front of each of the TDI imagers 1210, 1212. Alternatively, some embodiments may allow TDI imagers to share a filter wheel. For example, separate emission filters loaded on a dual port filter wheel 1220 may be used to filter the light for different wavelength ranges, as shown in greater detail below in FIG. 13. The design may increase the throughput by 2x from single TDI, where two separate TDI sensors are used as illustrated in FIG. 12. A similar architecture may be expanded to multiple TDI imagers, MBDs, and filter combinations to further increase the imaging throughput.

Figure 13:
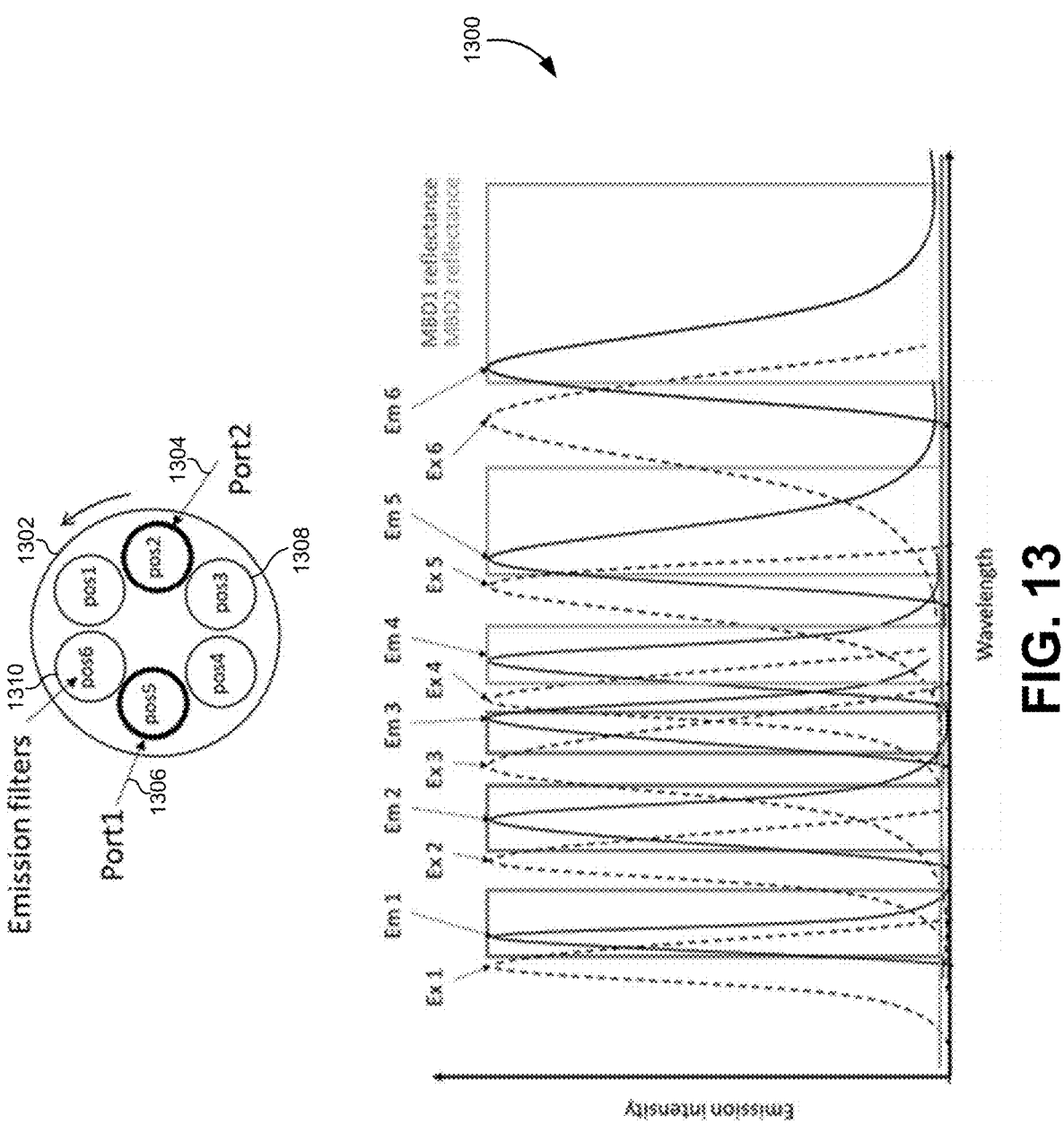
FIG. 13 illustrates how a filters can be configured to avoid overlapping wavelength ranges, according to some embodiments.

FIG. 13 illustrates how a filters can be configured to avoid overlapping wavelength ranges, according to some embodiments. As described above in FIG. 12, a single filter wheel 1302 may be used to rotate filters in front of a TDI imager. For example, the filter wheel 1302 may include six different filters, corresponding to six different wavelength ranges from six different fluorophores. When using two adjacent TDI imagers, the filter wheel 1302 may be positioned between these two TDI imagers and shared. For example, port 1306 may include a filter applied to a first TDI sensor, and port 1304 may be applied to a second TDI sensor. When rotating the filter wheel 1302, the positions on opposite sides of the filter wheel 1302 may be configured to line up with the adjacent TDI sensors behind each position on the filter wheel 1302. For example, rotating the filter wheel 1302 in a counterclockwise direction would move port 1310 over the first TDI sensor and port 1308 over the second TDI sensor.

The graph 1300 illustrates the emission intensity of the different fluorophores as a function of wavelength. In selecting fluorophores that can be activated simultaneously and captured using multiple TDI imagers, some embodiments may make the selections in order to minimize overlap in the fluorescent responses of the fluorophores. For example, emission filters for wavelengths, Em1 and Em4 may be loaded into opposing ports, respectively. After the images are acquired from both TDI imagers concurrently, the filter wheel 1302 may rotate to the next position using Em2 and Em5 while switching the excitation wavelengths to Ex2 and Ex5. In the next round, the filter wheel 1302 may rotate to collect data from Em3 and Em6.

Figure 14:
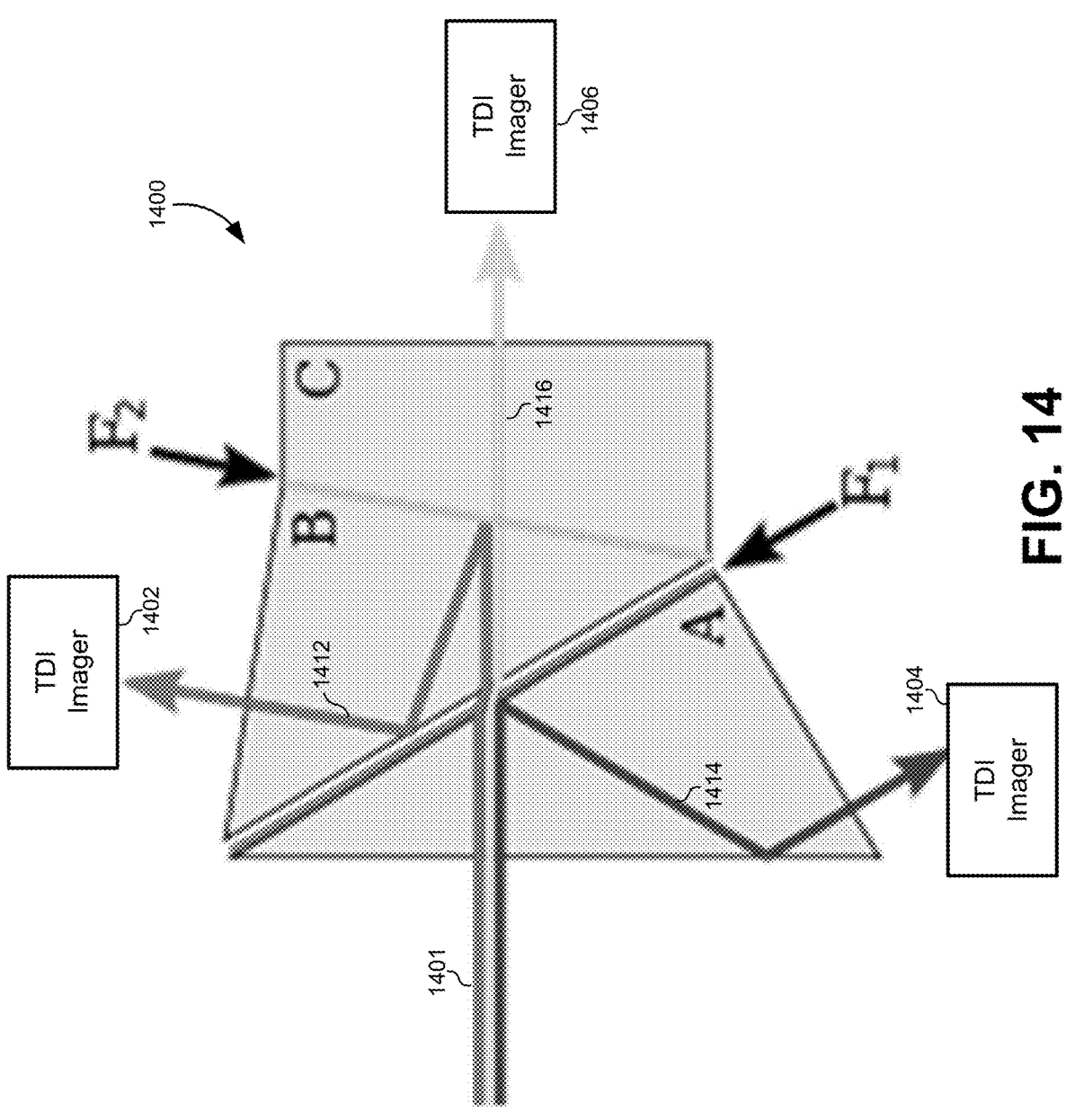
FIG. 14 illustrates an example of using a prism to project the image onto three separate TDI imagers simultaneously, according to some embodiments.

FIG. 14 illustrates an example of using a prism to project the image onto three separate TDI imagers simultaneously, according to some embodiments. A trichroic prism 1400 may be used to divide the wavelengths into three different regions within the prism 1400. Instead of using the MBD components described above, the light received from the sample may be routed through the prism 1400. Within the prism, different prism sections may be configured to separate, for example, the short, medium, and long wavelength responses from each other. Each of these wavelengths made then be directed onto an individual TDI imager. For example, the incoming light 1401 may enter the prism 1400 and be split into a first wavelength range 1414 that is directed into a first TDI imager 1404, into a second wavelength range 1412 that is directed into a second TDI imager, and into a third wavelength range 1416 that is directed into a third TDI sensor 1406. Note that any number of wavelength ranges and TDI imagers may be used by changing the configuration of the prism 1400. Three TDI imagers are used in FIG. 14 merely by way of example, and this is not meant to be limiting.

Figure 15:
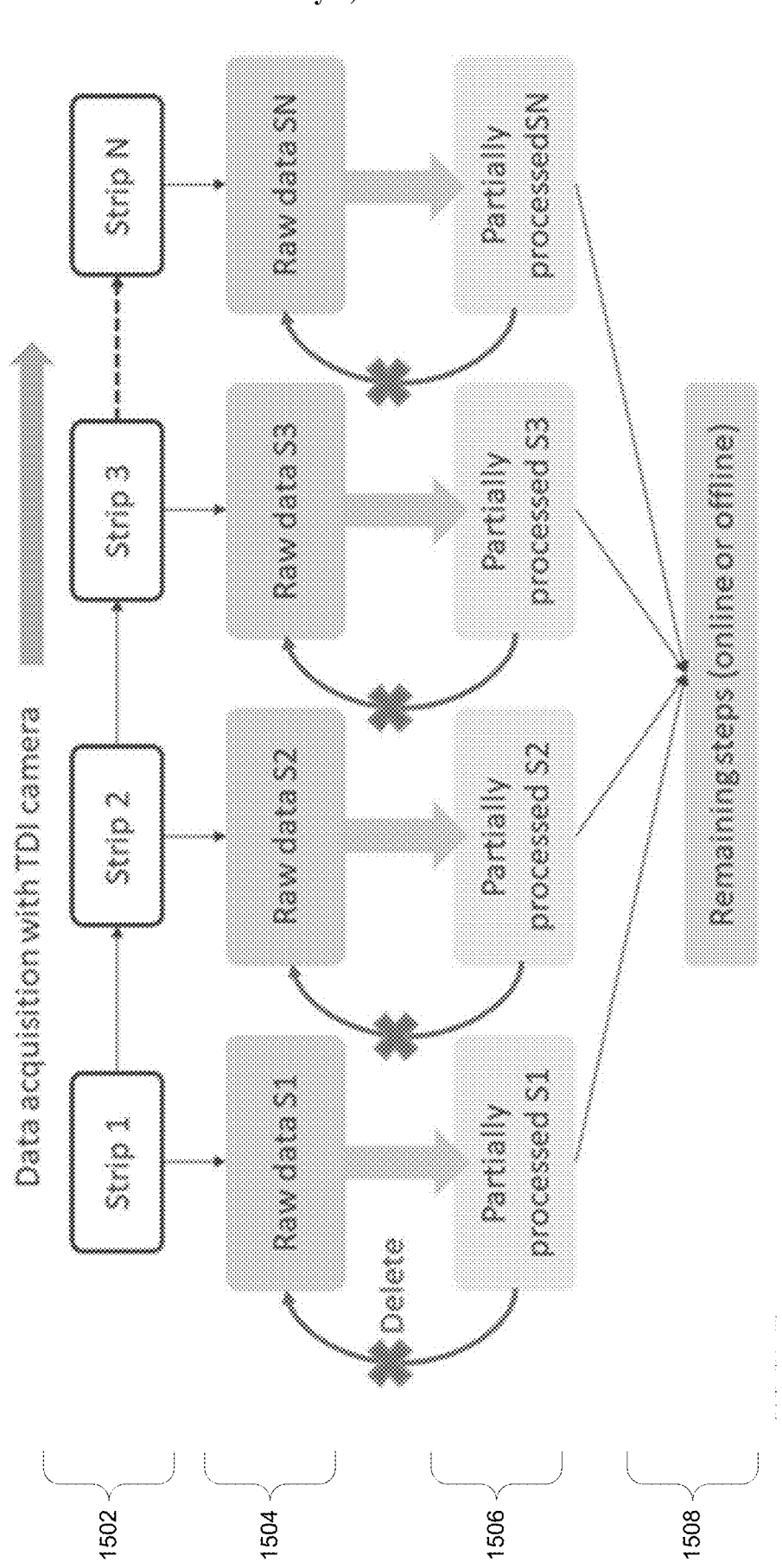
FIG. 15 illustrates a flow diagram for online preprocessing of image data, according to some embodiments.

FIG. 15 illustrates a flow diagram for online preprocessing of image data, according to some embodiments. Current state-of-the-art spatial-omics data analysis pipelines function on completely acquired data sets offline. The offline solution, while easy to implement, does not support high-throughput. Large amounts of raw data often result in significant overhead time during data transfer from the image acquisition to the storage devices. Additionally, both computation time and storage space required for the offline analysis scale proportionally to raw input data size. For example, a typical data set of 2 mm×2 mm images and 7 Z-slices takes 105 GB storage space, about 4 hours offline processing time, and generates temporary outputs that are 20%-100% of its original size. It is not feasible to directly scale up hardware for experiments with 2-3 orders of magnitude higher throughput. Therefore, an online image processing workflow can effectively reduce data transfer overhead and offline computation time by starting image processing during the image acquisition after each acquisition step.

As illustrated in FIG. 15, the TDI imager may scan columns or "strips" of image data. These strips 1502 may be stored as raw image data 1504 in a temporary storage. While the strips 1502 of images are continuously acquired by the TDI camera and saved on the local SSD drive as raw image data 1504, an online processing software module may read each set of raw image data 1504 and conduct preprocessing steps that may be time-consuming, but which may be a prerequisite to spatial-omics analysis. This preprocessing may include removing image artifacts, filtering the images, and other processes that "cleanup" the image. The partially processed data 1506 may overwrite the raw image data 1504 and may be merged into full image data 1508 for further processing. No additional storage space may be required from the downstream steps. By preprocessing the data during the image acquisition process, this technique may save as much as 40% of the previous offline preprocessing time and nearly 100% of data transfer time. The overall time required by data processing may be reduced by as much as 60%.

Additionally, traditional image processing algorithms, such as filtering and thresholding, often require case-by-case parameter tuning, and thus cannot provide a robust solution for spot-like fluorescent signal tracking. However, some embodiments may use a trained computational neural network (CNN) model to effectively distinguish the desired spotty features from images with various noise level and cell morphology. This model may be integrated into the online imaging process workflow and used to identify fluorescent spots at subpixel precision from each image strip during acquisition. Instead of saving raw or partially processed images, only vital information for spatial-omics analysis, such as locations and other attributes, may need preservation. The CNN may operate on a GPU to improve the processing speed. This type of deep learning and data pipelining may accommodate data flow in a high-throughput format for the imaging platform with high efficiency.

Figure 16:
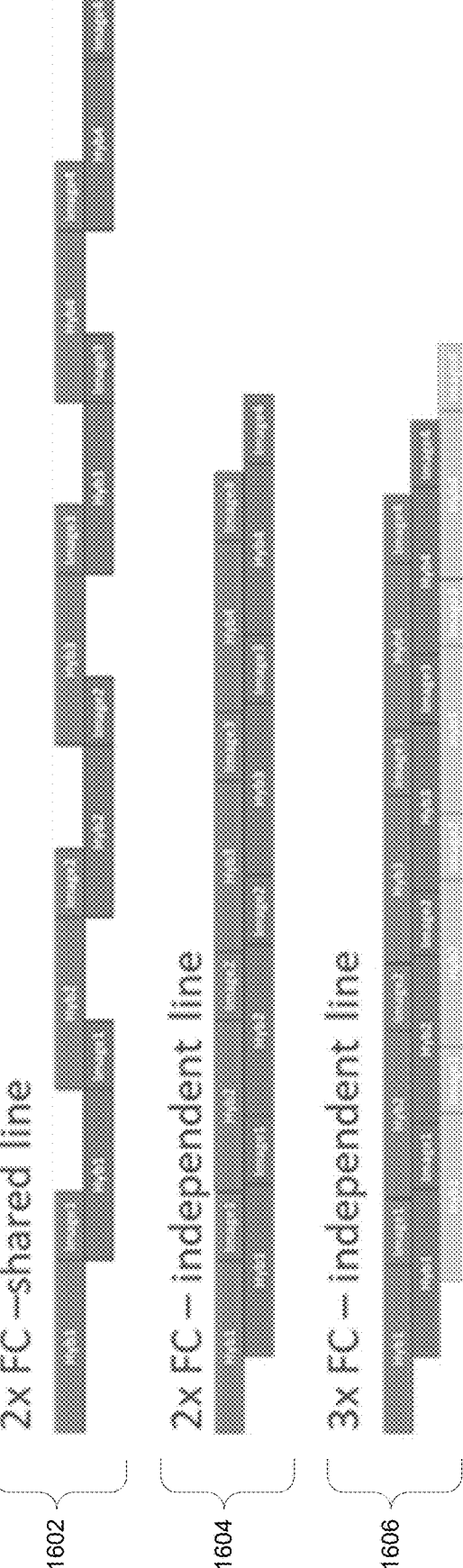
FIG. 16 illustrates an image processing pipeline for an imaging system with multiple imaging chambers operating concurrently, according to some embodiments.

FIG. 16 illustrates an image processing pipeline for an imaging system with multiple imaging chambers operating concurrently, according to some embodiments. Because the imaging time is comparable or shorter than fluidic time, the throughput can be further increased by imaging more flow cells in a single experiment. If each flow cell has an independent fluid circuit, the total throughput can be increase n-fold when the imaging time is 1/n of fluidic time, where n is number of flow cells.

For example, the pipeline 1602 illustrated in FIG. 16 illustrates the time for imaging two flow cells without independent fluidic circuits. Note that the fluid system for the second flow cell does not begin operating until the shared fluidic system is done with the first flow cell. Pipeline 1604 and pipeline 1606 illustrate how two and three flow cells, respectively can operate in parallel by using independent fluid lines. Note that the next flow cell can begin the imaging process as soon the previous flow cell is done, since the imager is still shared between flow cells but the independent fluidic systems can operate simultaneously.

Figure 17:
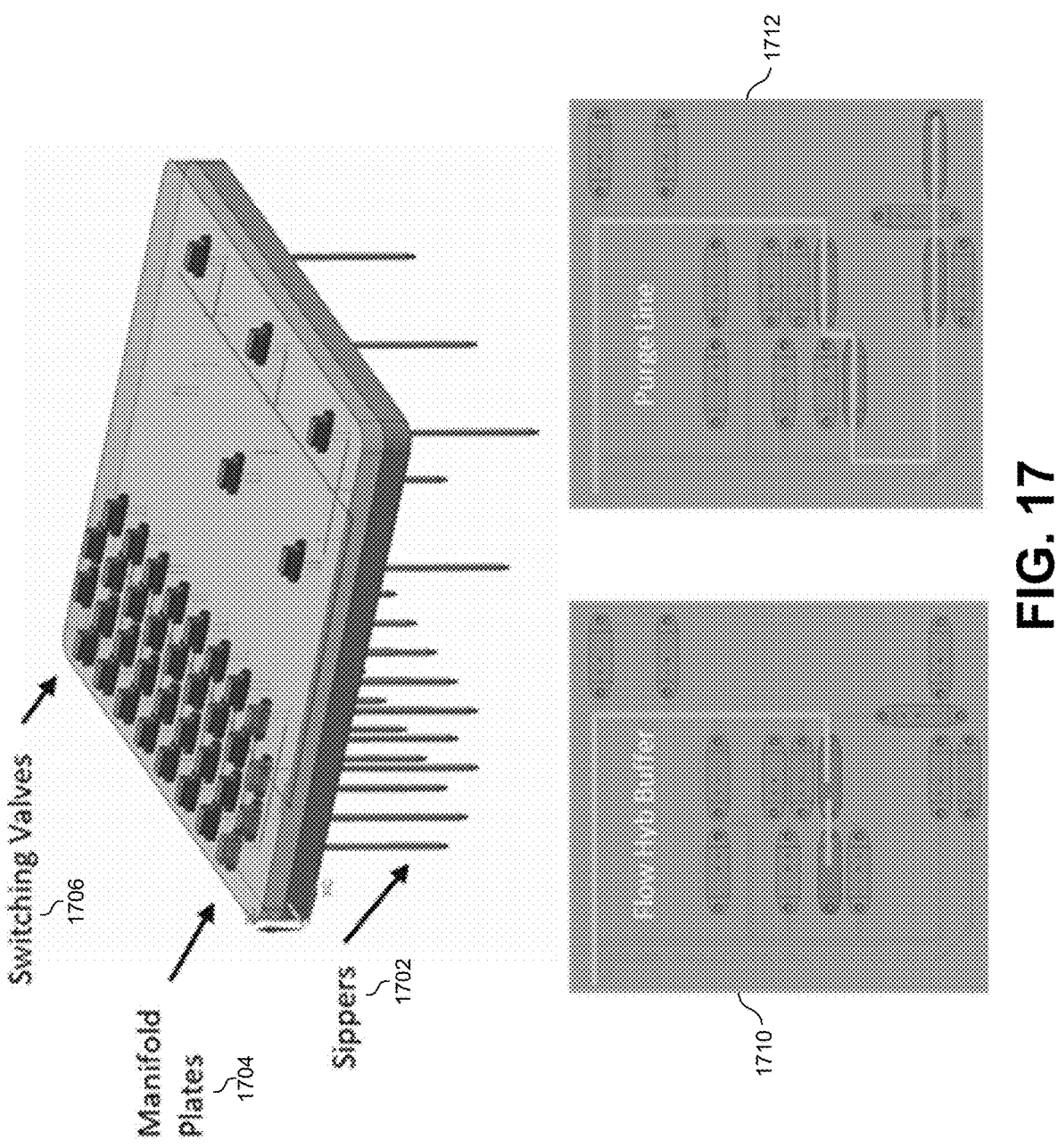
FIG. 17 illustrates a set of solenoid switching valves in a switching manifold, according to some embodiments.

FIG. 17 illustrates a set of solenoid switching valves in a switching manifold, according to some embodiments. Prior to this disclosure, the conventional fluidic system pressurized a chamber to apply pressure to all the liquids to be delivered to the flow cell. Each sipper 1702 had an individual fluidic line that delivered fluid to a rotary switching valve (not shown), which opened a path from each individual sipper 1702 to the flow cell. The sippers 1702 extend down into each of the fluid storage containers to retrieve the fluid to be injected into the flow cell. However, only one fluid at a time could be delivered to the flow cell. Thus, the fluid had to travel from the sipper 1702, through the fluidic bundle, and then through the rotatory switching valves. The fluidic bundle was required because the switching valves were far from the manifold plate 1704, and because the pressurized chamber slid out and away from the switching valves for serviceability of the tool. This resulted in a very large "dead volume"—as much as 1000 μL—of pressurized fluid between the sippers 1702 and the rotary valves. Therefore, a large amount of fluid was wasted in this dead volume before being delivered to the flow cell.

FIG. 17 illustrates an optimized set of solenoid switches 1706 that are mounted above the sippers 1702 in the manifold plates 1704. Placing the switches 1706 close to the sippers 1702 removes the dead volume of liquid that was required to pressurize the fluid between the sippers 1702 and the more remote rotary valve. Instead, the only dead volume of liquid is between the sipper 1702 and the switches 1706. Moving the switches 1706 on top of the manifold plates 1704 above the sippers 1702 eliminates the need for the long, pressurized tubing bundle. Consequently, this means only small volumes of expensive reagents need to be prepared and smaller volumes of reagents need to be shipped and stored at customer sites.

The switches 1706 also save a considerable amount of space in the imaging system. This reduces the footprint of the imaging system and also reduces the weight of the imaging system.

Additionally, previous designs with X flow cells used 2× rotary valves and X sensors (pressure, bubble, etc.). Adding an additional flow cell would require an additional two rotary valves, additional space on the manifold plates 1704, and at least 17 more lines in the tubing bundle running to the rotary valves. In contrast, the configuration illustrated in FIG. 17 may add an additional flow cell using only 17 additional switches 1706 and X additional sensors. No additional tubing is needed.

FIG. 17 also illustrates a routing path 1710 for a flow line, along with a routing path 1712 for a purge line. The switches 1706 may include three states (or multiple switches may allow for different routes). For example, a first state or routing may close the switch off from the flow cell. A second state or routing may open the switch to provide a path 1710 from a particular sipper 1702 to a particular flow cell. A third state or routing may open the switch to provide a path 1712 to a purge line.

Figure 18:
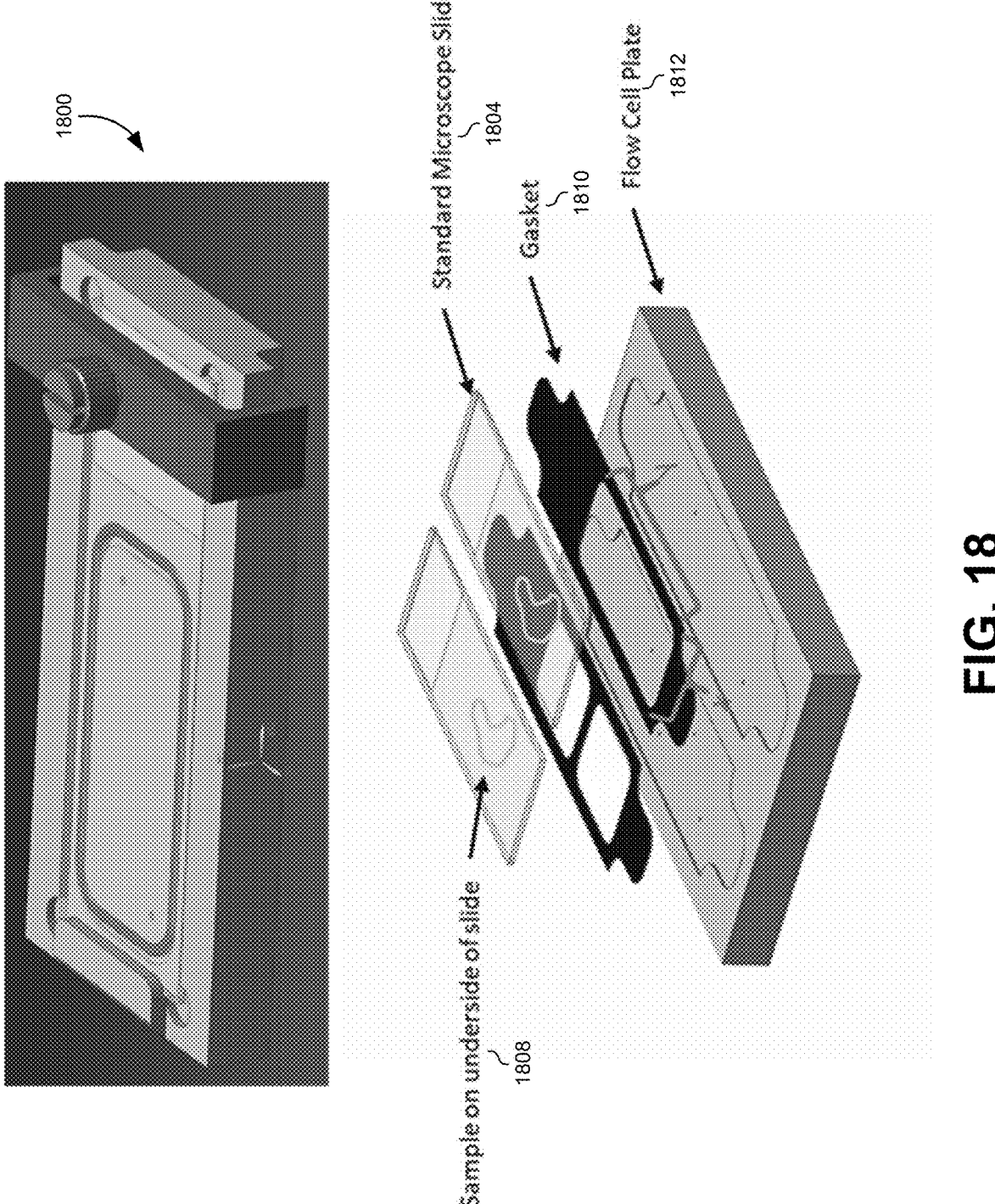
FIG. 18 illustrates a flow cell, according to some embodiments.

FIG. 18 illustrates a flow cell, according to some embodiments. Conventional flow cell use a thin glass coverslip to mount the sample. The flow cell typically had a large margin to allow additional support to this thin glass, which largely reduced the imageable area. In addition, the scanning area was further constrained by the size of the objective lens tip and working distance between the tip and the glass. For example, a typical 40× objective lens has a 12 mm diameter and a short working distance, which means the objective lens can only get as close as 6 mm to the edge of a 30 mm diameter imaging area, thereby reducing the effective imageable area to about a 18 mm diameter. Allowing for a 2 mm guard band to prevent collisions, this brings the scannable area to a 14 mm diameter area (or about 153 mm$^2$).

In contrast, the flow cell 1800 shown in FIG. 18 may use a 1 mm thick glass slide 1804 to mount the tissue sample 1808. For example, the area may be about 26 mm×75 mm (or about 1950 mm$^2$). By flipping the glass slide 1804 upside down to image through the glass slide yields a much larger area for imaging. Since the 1 mm slide is stiffer than the previous thinner slides, the clamping width of the glass slide may be reduced down to about 1 mm-2 mm, thus bringing the scannable area up to about 1584 mm$^2$. Some embodiments may also have an area that is used for a label, which may reduce the scannable area down to about 22 mm×50 mm (or about 1100 mm$^2$).

In some alternate embodiments, a plastic coverslip with an adhesive gasket 1810 may be used on the periphery. The sample 18080 may be prepared on a microscope slide and then the adhesive coverslip may be adhered to this slide. No clamping may be necessary to keep the coverslip in place. Fluids may be delivered through coverslips and/or through a modified microscope slide. Liquids may also be provided through the plastic coverslip, or the liquids may be delivered through the sides of the flow cell, possibly through the gasket 1810.

These flow cell designs provide numerous advantages. For example, no coverslip is needed since the glass slide 1804 acts as the coverslip. No thin glass slides are needed. The glass slide 1804 may be implemented using a standard microscope slide, which are low-cost and readily available. The flow cell plate 1812 may include routing to deliver fluids to the flow cell through. Both single-cell designs and multiple-cell designs may be provided, as illustrated in FIG. 18.

Figure 19:
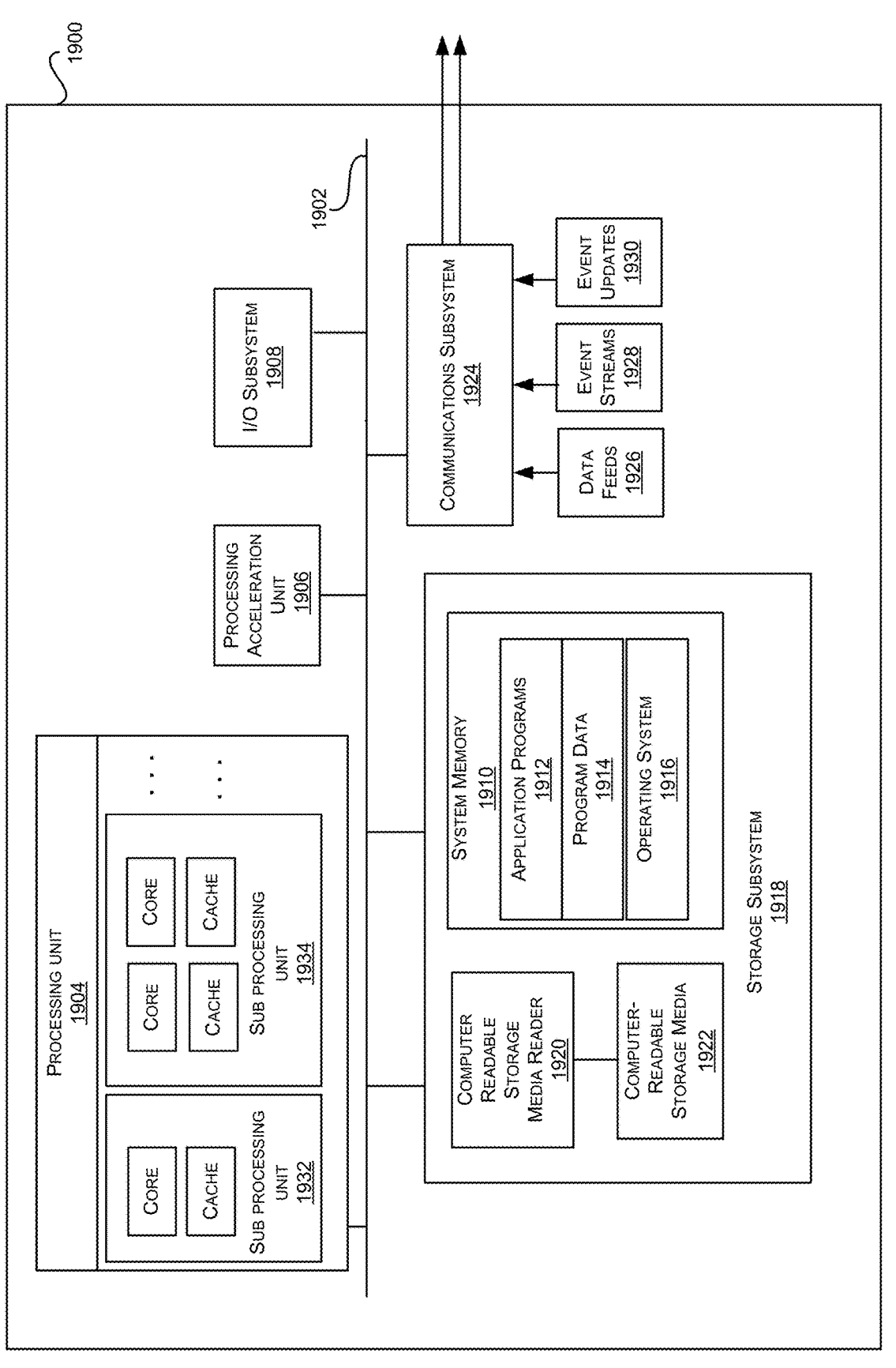
FIG. 19 illustrates an exemplary computer system, in which various embodiments may be implemented.

FIG. 19 illustrates an exemplary computer system 1900, in which various embodiments may be implemented. The system 1900 may be used to implement any of the computer systems described above, including the controller of the imaging system 100. As shown in the figure, computer system 1900 includes a processing unit 1904 that communicates with a number of peripheral subsystems via a bus subsystem 1902. These peripheral subsystems may include a processing acceleration unit 1906, an I/O subsystem 1908, a storage subsystem 1918 and a communications subsystem 1924. Storage subsystem 1918 includes tangible computer-readable storage media 1922 and a system memory 1910.

Bus subsystem 1902 provides a mechanism for letting the various components and subsystems of computer system 1900 communicate with each other as intended. Although bus subsystem 1902 is shown schematically as a single bus, alternative embodiments of the bus subsystem may utilize multiple buses. Bus subsystem 1902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1904, which can be implemented as one or more integrated circuits (e.g., a conventional microprocessor or microcontroller), controls the operation of computer system 1900. One or more processors may be included in processing unit 1904. These processors may include single core or multicore processors. In certain embodiments, processing unit 1904 may be implemented as one or more independent processing units 1932 and/or 1934 with single or multicore processors included in each processing unit. In other embodiments, processing unit 1904 may also be implemented as a quad-core processing unit formed by integrating two dual-core processors into a single chip.

In various embodiments, processing unit 1904 can execute a variety of programs in response to program code and can maintain multiple concurrently executing programs or processes. At any given time, some or all of the program code to be executed can be resident in processor(s) 1904 and/or in storage subsystem 1918. Through suitable programming, processor(s) 1904 can provide various functionalities described above. Computer system 1900 may additionally include a processing acceleration unit 1906, which can include a digital signal processor (DSP), a special-purpose processor, and/or the like.

I/O subsystem 1908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1900 may comprise a storage subsystem 1918 that comprises software elements, shown as being currently located within a system memory 1910. System memory 1910 may store program instructions that are loadable and executable on processing unit 1904, as well as data generated during the execution of these programs.

Depending on the configuration and type of computer system 1900, system memory 1910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1904. In some implementations, system memory 1910 may include multiple different types of memory, such as static random access memory (SRAM) or dynamic random access memory (DRAM). In some implementations, a basic input/output system (BIOS), containing the basic routines that help to transfer information between elements within computer system 1900, such as during start-up, may typically be stored in the ROM. By way of example, and not limitation, system memory 1910 also illustrates application programs 1912, which may include client applications, Web browsers, mid-tier applications, relational database management systems (RDBMS), etc., program data 1914, and an operating system 1916. By way of example, operating system 1916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1918. These software modules or instructions may be executed by processing unit 1904. Storage subsystem 1918 may also provide a repository for storing data used in accordance with some embodiments.

Storage subsystem 1900 may also include a computer-readable storage media reader 1920 that can further be connected to computer-readable storage media 1922. Together and, optionally, in combination with system memory 1910, computer-readable storage media 1922 may comprehensively represent remote, local, fixed, and/or removable storage devices plus storage media for temporarily and/or more permanently containing, storing, transmitting, and retrieving computer-readable information.

Computer-readable storage media 1922 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1900.

By way of example, computer-readable storage media 1922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1922 may include, but is not limited to, Zip® drives, flash memory cards, universal serial bus (USB) flash drives, secure digital (SD) cards, DVD disks, digital video tape, and the like. Computer-readable storage media 1922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1900.

Communications subsystem 1924 provides an interface to other computer systems and networks. Communications subsystem 1924 serves as an interface for receiving data from and transmitting data to other systems from computer system 1900. For example, communications subsystem 1924 may enable computer system 1900 to connect to one or more devices via the Internet. In some embodiments communications subsystem 1924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1924 can provide wired network connectivity (e.g., Ethernet) in addition to or instead of a wireless interface.

In some embodiments, communications subsystem 1924 may also receive input communication in the form of structured and/or unstructured data feeds 1926, event streams 1928, event updates 1930, and the like on behalf of one or more users who may use computer system 1900.

By way of example, communications subsystem 1924 may be configured to receive data feeds 1926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1924 may also be configured to receive data in the form of continuous data streams, which may include event streams 1928 of real-time events and/or event updates 1930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1924 may also be configured to output the structured and/or unstructured data feeds 1926, event streams 1928, event updates 1930, and the like to one or more databases that may be in communication with one or more streaming data source computers coupled to computer system 1900.

Due to the ever-changing nature of computers and networks, the description of computer system 1900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

As used herein, the terms "about" or "approximately" or "substantially" may be interpreted as being within a range that would be expected by one having ordinary skill in the art in light of the specification.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. An imaging system for capturing spatial images of biological tissue samples, the imaging system comprising:
    an imaging chamber configured to hold a biological tissue sample placed in the imaging system;

a light source configured to illuminate the biological tissue sample to activate a plurality of fluorophores in the biological tissue sample; and a plurality of Time Delay and Integration (TDI) imagers configured to simultaneously scan the biological tissue sample, wherein the plurality of TDI imagers are configured to separately receive light from different ones of the plurality of fluorophores.

2. The imaging system of claim 1, wherein the imaging system is configured to illuminate the biological tissue sample with light that is shaped similar to a shape one of the plurality of TDI imagers.

3. The imaging system of claim 1, further comprising a plurality of filters, each of which correspond to one of the plurality of fluorophores.

4. The imaging system of claim 1, further comprising a filter wheel, wherein a first filter on the filter wheel covers a first TDI imager in the plurality of TDI imagers, and a second filter on the filter wheel covers a second TDI imager in the plurality of TDI imagers.

5. The imaging system of claim 1, wherein the imaging system is configured to scan a strip of the biological tissue sample in a first direction, then scan an adjacent strip of the biological tissue sample in a second direction that is opposite of the first direction.

6. The imaging system of claim 5, wherein the imaging system is configured to focus the imaging system on the biological tissue sample at a beginning of each strip being scanned.

7. The imaging system of claim 5, wherein the imaging system is configured to focus the imaging system continually during operation based on a surface mapping of the biological tissue sample.

8. The imaging system of claim 1, further comprising a doublet and a cylindrical lens configured to provide Critical-Kholer illumination of the biological tissue sample.

9. The imaging system of claim 1, further comprising a Powell lens and a collimator to illuminate the biological tissue sample.

10. The imaging system of claim 1, wherein a motion of the biological tissue sample is synchronized with an image capture of the plurality of TDI imagers using a trigger signal that is derived by dividing a main clock signal.

11. A method of capturing spatial images of biological tissue samples, the method comprising:

mounting a biological tissue sample in an imaging chamber of an imaging system;

directing light from a light source to illuminate an area on the biological tissue sample to activate a plurality of fluorophores in the biological tissue sample; and scanning the biological tissue sample with a plurality of Time Delay and Integration (TDI) imagers configured to simultaneously scan the biological tissue sample, wherein the plurality of TDI imagers are configured to separately receive light from different ones of the plurality of fluorophores.

12. The method of claim 11, further comprising directing a light signal through a first filter onto a first TDI imager in the plurality of TDI imagers using a multiband dichroic mirror.

13. The method of claim 11, wherein a first fluorophore in the plurality of fluorophores is received by a first TDI imager in the plurality of TDI imagers, a second fluorophore in the plurality of fluorophores is received by a second TDI imager in the plurality of TDI emitters, and the first fluorophore and the second fluorophore have non-adjacent wavelength ranges in the plurality of fluorophores.

14. The method of claim 11, further comprising directing a light signal received from the biological tissue sample into a prism to separate the light signal into separate light signals corresponding to different fluorophores in the plurality of fluorophores.

15. The method of claim 11, further comprising processing first raw image data from a first strip received from the plurality of TDI imagers while second raw image data is being scanned by the plurality of TDI imagers.

16. An imaging system comprising:

a plurality of Time Delay and Integration (TDI) imagers configured to simultaneously scan a biological tissue sample, wherein the plurality of TDI imagers are configured to separately receive light from different ones of a plurality of fluorophores.

17. The imaging system of claim 16, further comprising a plurality of filters, each of which correspond to one of the plurality of fluorophores.

18. The imaging system of claim 16, further comprising a filter wheel, wherein a first filter on the filter wheel covers a first TDI imager in the plurality of TDI imagers, and a second filter on the filter wheel covers a second TDI imager in the plurality of TDI imagers.

19. The imaging system of claim 16, wherein the imaging system is configured to scan a strip of the biological tissue sample in a first direction, then scan an adjacent strip of the biological tissue sample in a second direction that is opposite of the first direction.

20. The imaging system of claim 19, wherein the imaging system is configured to focus the imaging system on the biological tissue sample at a beginning of each strip being scanned.

* * * * *